US008619812B2

(12) United States Patent
Madan et al.

(10) Patent No.: US 8,619,812 B2
(45) Date of Patent: Dec. 31, 2013

(54) CAMEL ROAMING SERVICES BETWEEN OPERATORS WITH DIFFERENT CAMEL PHASE

(75) Inventors: Atul Madan, New Delhi (IN); Pankaj Sharma, New Delhi (IN); Nilay Kumar, New Delhi (IN); Naveen Tandon, New Delhi (IN); Ashwani Kesharwani, New Delhi (IN); Deepak Kumar Garg, New Delhi (IN)

(73) Assignee: Comviva Technologies Limited, New Delhi (IN)

( * ) Notice: Subject to any disclaimer, the term of this patent is extended or adjusted under 35 U.S.C. 154(b) by 484 days.

(21) Appl. No.: 12/867,836

(22) PCT Filed: Feb. 16, 2009

(86) PCT No.: PCT/IN2009/000107
§ 371 (c)(1),
(2), (4) Date: Oct. 2, 2010

(87) PCT Pub. No.: WO2009/101638
PCT Pub. Date: Aug. 20, 2009

(65) Prior Publication Data
US 2011/0045828 A1 Feb. 24, 2011

(30) Foreign Application Priority Data
Feb. 16, 2008 (IN) .............................. 132/DEL/2008

(51) Int. Cl.
*H04L 12/28* (2006.01)
*H04L 12/56* (2011.01)
*H04W 4/00* (2009.01)

(52) U.S. Cl.
USPC ........... 370/467; 370/312; 370/401; 370/422; 455/432.1; 455/432.2; 455/433; 709/228

(58) Field of Classification Search
USPC ............ 455/432.1–433; 370/467, 241.1, 329, 370/331, 236, 401, 410, 422, 426; 709/228
See application file for complete search history.

(56) References Cited

U.S. PATENT DOCUMENTS

| 7,609,682 B2 * | 10/2009 | Ang et al. ..................... 370/349 |
| 7,664,494 B2 * | 2/2010 | Jiang .......................... 455/432.1 |
| 2003/0031160 A1 * | 2/2003 | Gibson Ang et al. ......... 370/349 |

(Continued)

FOREIGN PATENT DOCUMENTS

| EP | 1 156 692 A1 | 11/2001 |
| EP | 1 725 065 A1 | 11/2006 |

(Continued)

*Primary Examiner* — Allahyar Kasraian
(74) *Attorney, Agent, or Firm* — Workman Nydegger

(57) ABSTRACT

This invention, in general, relates to the field of telecommunications. More particularly, the present invention relates to a centralized system and method for providing customized applications for mobile networks enhanced logic CAMEL roaming services to a mobile subscriber. The CAMEL HUB configured to process a request from the mobile subscriber to avail one or more mobile services from a visited network operator. The mobile subscriber device has a subscription to a home network operator and operates in a home CAMEL phase. The visited network operator operates in a visited CAMEL phase. The CAMEL HUB is also configured to allow the mobile subscriber device to avail the one or more mobile services seamlessly from the visited network operator independent of the visited CAMEL phase. The home CAMEL phase may or may not be different from the visited CAMEL phase.

8 Claims, 12 Drawing Sheets

(56) References Cited

U.S. PATENT DOCUMENTS

| | | | |
|---|---|---|---|
| 2003/0072425 A1* | 4/2003 | Hurst | 379/114.01 |
| 2005/0221819 A1* | 10/2005 | Patel et al. | 455/432.1 |
| 2006/0025129 A1* | 2/2006 | Wolfman et al. | 455/432.1 |
| 2006/0148470 A1* | 7/2006 | Kumar et al. | 455/432.1 |
| 2006/0229090 A1* | 10/2006 | LaDue | 455/507 |
| 2006/0240822 A1* | 10/2006 | Jiang | 455/433 |
| 2006/0252425 A1* | 11/2006 | Jiang | 455/432.1 |
| 2006/0276226 A1* | 12/2006 | Jiang | 455/558 |
| 2007/0213075 A1* | 9/2007 | Jiang | 455/461 |
| 2007/0281687 A1* | 12/2007 | Jiang | 455/433 |
| 2008/0125117 A1* | 5/2008 | Jiang | 455/433 |
| 2009/0190468 A1* | 7/2009 | Gillot et al. | 370/216 |
| 2010/0120435 A1* | 5/2010 | Mia et al. | 455/440 |
| 2010/0128685 A1* | 5/2010 | Jiang | 370/329 |
| 2010/0144344 A1* | 6/2010 | Jiang | 455/433 |
| 2010/0190492 A1* | 7/2010 | Jiang | 455/432.1 |
| 2012/0064859 A1* | 3/2012 | Jiang et al. | 455/408 |

FOREIGN PATENT DOCUMENTS

| | | |
|---|---|---|
| WO | 2006/121894 A2 | 11/2006 |
| WO | 2008/013964 A2 | 1/2008 |
| WO | 2008/017951 A2 | 2/2008 |

* cited by examiner

CAMEL ROAMING SERVICES BETWEEN OPERATORS WITH DIFFERENT CAMEL PHASE

FIELD OF THE INVENTION

This invention, in general, relates to the field of telecommunications. More particularly, the present invention relates to a centralized system and method for providing CAMEL (Customized Applications for Mobile Networks Enhanced Logic) roaming services.

BACKGROUND OF THE INVENTION

Customized applications for mobile networks enhanced Logic (CAMEL), is designed to work on either a global system for mobile communications (GSM) core network or universal mobile telecommunications system (UMTS) network. CAMEL allows an operator to define services over and above standard GSM services/UMTS services. CAMEL architecture is based on Intelligent Network (IN) standards, and uses the CAMEL application part (CAP) protocol.

Many services can be created using CAMEL, and it is particularly effective in allowing these services to be offered when a subscriber is roaming, like for instance no-prefix dialing (the number the user dials is the same no matter the country where the call is placed) or seamless MMS message access from abroad.

CAMEL has been specified in 4 phase. phase1 and phase2 support adding IN services to a GSM network. CAMEL phase 1 provides basic call control capabilities such as call forwarding and basic virtual private network (VPN). CAMEL phase2 provides more advanced capabilities (both call control and non-call control related) such as on-line charging (call-control) and unstructured supplementary service data (USSD) control (non-call control). Phases3 and 4 support adding services to a unstructured supplementary service data (UMTS) network. All 4 phases can be used in either a GSM or a UMTS network.

In a normal and traditional scenario where there are multiple operators who want that their subscribers should get the mobile services in the other networks (partner network), they need to undergo a roaming agreement amongst them in order to establish smooth rollout of roaming services to their subscribers in the partner network. Since there are so many operators in the world and subscriber of any operator can move to any operator in the world, each operator has a need to undergo for such an agreement with almost every other operator in the world. This process is a very lengthy process and creates a mesh of agreements among all these operators. For a prepaid subscriber, over and above these agreements for roaming, there is a requirement of undergoing CAMEL test cases with each of the operators. Due to lots of incompatibility in the CAMEL version/phases running with these operators, this may result in a mesh.

Thus, a need exists for a centralized approach to provide CAMEL roaming services.

BRIEF SUMMARY OF THE INVENTION

These and other limitations are overcome by embodiments of the invention which relate to systems and methods for providing CAMEL Roaming Services.

This summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Systems and methods are disclosed for providing customized application for mobile network enhanced logic (CAMEL) roaming services to a mobile subscriber device. In an implementation, the system includes a CAMEL HUB configured to process a request from the mobile subscriber to avail one or more mobile services from a visited network operator. The mobile subscriber device has a subscription to a home network operator and operates in a home CAMEL phase. The visited network operator operates in a visited CAMEL phase. The CAMEL HUB is also configured to allow the mobile subscriber device to avail the one or more mobile services seamlessly from the visited network operator independent of the visited CAMEL phase. The home CAMEL phase may be different from the visited CAMEL phase. It is an object of the present invention to provide a centralized system and method for providing CAMEL roaming services thereby reducing mesh based testing and CAMEL setup among multiple operators.

It is a further an object of the present invention to provide a centralized system and method for providing CAMEL roaming that eliminates different kinds of incompatibilities among the operators relevant to CAMEL roaming.

These and other objects are achieved by a CAMEL HUB, configured to provide centralized CAMEL roaming services among multiple operators by enabling, without limiting, phase/version independent roaming.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The CAMEL provides mechanism to support services of operators, which are not covered by standardized global system for mobile communications (GSM) services when roaming outside the home public land mobile network (HPLMN). The CAMEL feature helps GSM mobile network operators to provide the subscribers with the operator specific services even while roaming outside the home public land mobile network (HPLMN). A CAMEL HUB system can be connected to either Gateway mobile switching center (GMSC) or signal transfer point (STP) system of a carrier. Many services can be created using CAMEL, and is particularly effective in allowing these services to be offered when a subscriber is in roaming, like for instance no-prefix dialing (the number the user dials is the same no matter the country where the call is placed) or seamless multimedia messaging services (MMS) message access from abroad.

CAMEL HUB therefore provides a centralized approach to provide CAMEL roaming services by its presence in a network which includes agreements with other existing network operators. The network where a CAMEL HUB is installed is referred as host network and the network which have agreements with each other for using CAMEL HUB for providing services to their roamers is referred as partner network. The networks, which are using the services of CAMEL HUB node, are referred as client networks. All the partner networks are client networks, since they all Will be using the services of CAMEL HUB.

Figure 1:
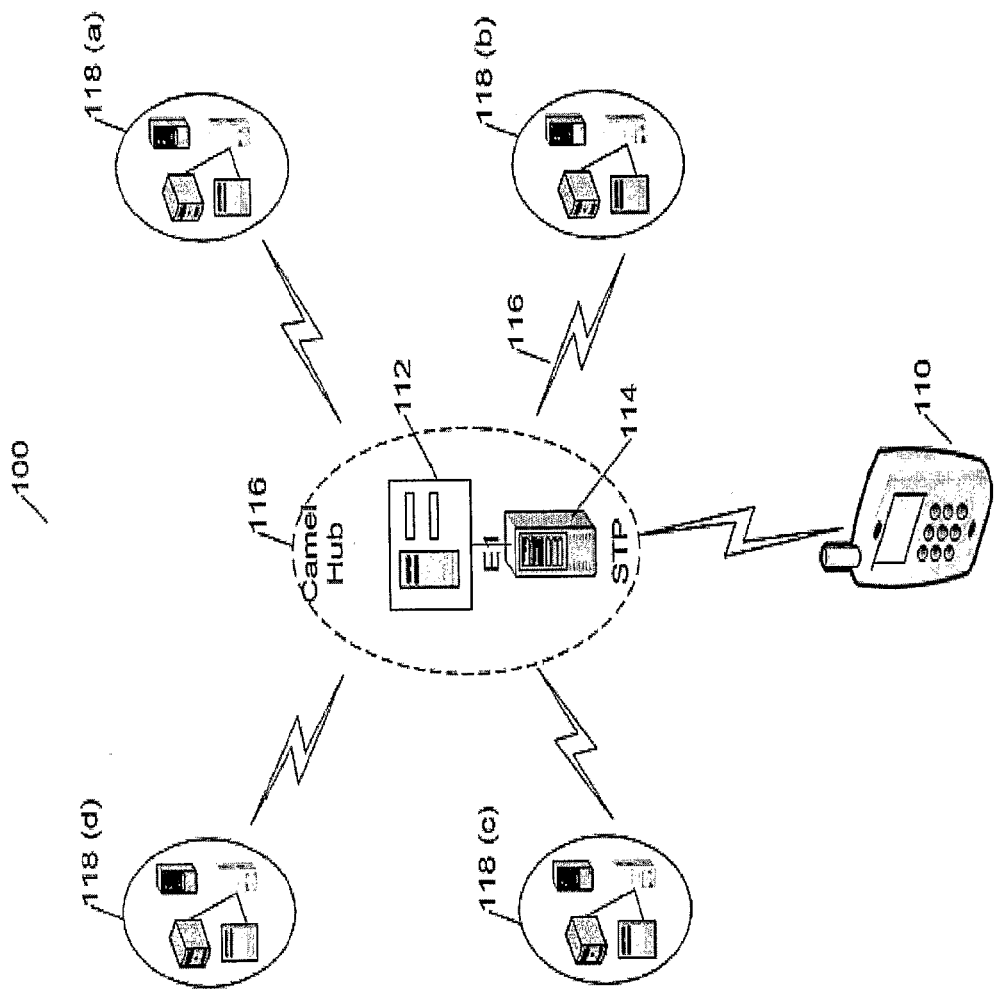
FIG. 1 illustrates the network diagram and interaction of CAMEL HUB with partner networks.

FIG. 1 illustrates a system 100 comprising network architecture of CAMEL HUB with its partnered network. The system 100 includes a user communication device 110, CAMEL HUB 112, STP 114. A user communication device 110 sends a request while in roaming to CAMEL HUB 112. The user communication device may include mobile station (MS) of any global system for mobile communications (GSM) or general packet radio system (GPRS). CAMEL HUB 112 is a centralized switch, which receives the request from user communication device 11 via STP 114. The CAMEL HUB 112 and STP 114 are in communication via E1 link as shown in FIG. 1. A STP 114 is a packet switch within a network that routes network call information among other circuit switches.

Figure 2:
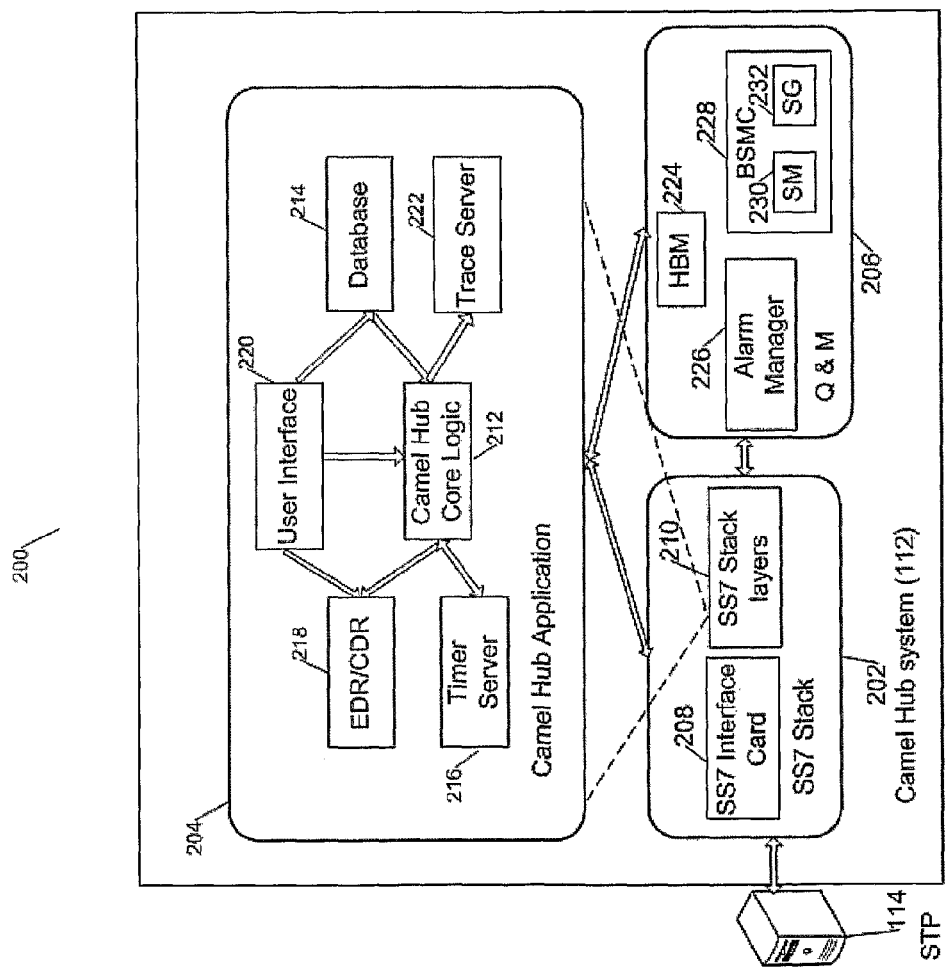
FIG. 2 shows an illustrative diagram of implementation of CAMEL HUB according to an embodiment of the present invention.

The CAMEL HUB 112 receives the information from user communication device 110 via STP 114 and identifies the request received from the user. The CAMEL HUB 112 gets connected with any of the partnered network i.e. 114(a), 114(b), 114(c) or 114(d) via SS7 (116) link and provides the requested information. FIG. 2 shows an illustrative diagram of implementation of CAMEL HUB 112 according to an embodiment of the present invention. The system 200 includes the CAMEL HUB 112 and the STP 114. The CAMEL HUB 112 further includes a signaling system (SS7) signaling stack module 202, CAMEL HUB application module 204 and an operation and maintenance management (herein after O&M) 206. The STP 114 is directly interfaced the CAMEL HUB 112 via E1 link.

The signaling stack module 202 is the primary interface for the CAMEL HUB 112 with the outside world. The interface is based on SS7 protocol standards and includes hardware as well as software modules comprising an SS7 interface card 208 and SS7 stack layer 210. The SS7 interface card 208 is a hardware module providing physical interface with the STPs/ GMSCs over E1 interface and message transfer part (MTP2) layer functionality. Similarly the SS7 Stack Layers 210 is the software module which includes the functionality of message transfer part (MTP3) and above (message transfer part+signaling connection control part+transaction capabilities application part+CAMEL application part, mobile application part) (MtP3+SCCP+TCAP+CAP; MAP).

The CAMEL HUB application module 204 includes various application level components, which are required to function in order to provide the functionality required by the CAMEL HUB system 112. The CAMEL HUB application module 204 interfaces with signalling stack module 202 in order to receive and send SS7 signals and also with O&M module 202 for various configurations and fault management purposes. The CAMEL HUB application module 204 includes CAMEL HUB core logic 212, database 214, timer server 216, event data record/call data record (herein after EDR/CDR) 218 and user interface 220.

The CAMEL HUB core logic 212 handles the core functionality to support various features of the system. It takes the control for message processing and also co-ordinates with other modules. The database 214 is used for storing and retrieving of data from the secondary memory. The timer server 216 is useful for controlling certain events based on time for e.g. triggering some action after a defined amount of time is lapsed. Further, the timer server 216 provides the functionality of creating a trigger after a defined time period has been lapsed so that an appropriate action can be taken.

EDR/CDR 218 is employed for every message passing through the CAMEL HUB system 112 as there require a need of recording certain information, which can be used later for data reconciliation, debugging purposes etc. Such information is called event data record (EDR), similarly for each call handled through the system there is some information e.g. start time, end time calling party, called party etc. which is known as call data record (CDR). The EDR/CDR 218 helps in providing functionality to create such records whenever application module core logic module 212 intents to do so.

User interface 220 is a graphical interface of the CAMEL HUB system 112, which helps in various configurations/ provisioning. Such configurations/provisioning controls the functionality and features of the system 200.

The trace server 222 is employed for generating traces (detailed processing info) if required for debugging purposes.

The O&M module 206 includes a heart beat manager (herein after HBM) 224, alarm manager 226 and stack manager component (SMC) 228. The SMC 228 further includes stack manager 230 and system manager 232. The O&M module 206 is responsible for various system management activities that included but not limited, to configurations, fault management, alarm management, and start up and shutdown etc. The heart beat manager (HBM) 224 checks the physical condition of integrated applications after a configured time interval and takes corrective action in case the application goes down. The alarm manager 226 is an independent module of operations and maintenance (OAM), which accepts alarms from discrete applications and forwards them to desired media. The alarm manager 226 further provides several options for alarm filtering, alarm frequency time out, blocking and therefore can be integrated with different kind of media such as short message service (SMS), Mail, graphical user interface (GUI) and simple network management protocol (SNMP).

The SMC 228 controls and manages all the system and signaling binaries. The SMC 228 further includes stack manager (herein after SM) 230 and system manager (herein after SG) 232. The SM 230 interfaces with SMC 228 over user datagram protocol (UDP) interface. The SM 230 accepts control as well as configuration commands initiated from the SMC 228 and executes them on SG 232 or stack instances. Similarly, the SG 232 accepts control commands from SM 230 and gets executed. The SG 232 enables and disables a stack instance. It may be noted that there can be maximum of two SGs in the SMC 228 although, the system is described using essential components. It will be obvious to a person skilled in the art that the system includes various other components not shown in the figure.

An example of message flow in a CAMEL HUB can be explained by assuming two mobile operators X and Y. Operator X is configured as a home public land mobile network (HPLMN) and Operator Y is configured as a visited public land mobile network (VPLMN).

A mobile subscriber (MS) from X (HPLMN) network moves to a Y (VPLMN) network and latches successfully after completing the location update process (which also happens through CAMEL HUB 112). In an example embodiment, when this subscriber tries to make an outgoing call, the VPLMN Y network service switching point (SSP) generates an initial IDP SS7 CAMEL message towards the CAMEL HUB 112 system through the STP 114 Since CAMEL HUB 112 is directly connected to the STP 114. The STP 114 forwards this message to CAMEL HUB 112 based on the sub system number (SSN) and changes the translation type (TT) to 20. The CAMEL HUB 112 system receives this message via SS7 interface card 208 and SS7 stack layers 210, which is typically a 7-layer SS7 protocol.

The SCCP layer of this SS7 stack 202 checks the TT and sends message to CAMEL HUB Core module 212 via the CAMEL application part (CAP) layer of SS7 stack.

The CAMEL application core module processes the message in two ways: relay mode and modification mode.

In a relay mode the CAMEL HUB core logic 212 searches the database 214 for the received message (e.g. Initial Detection Point (DP) Message) and checks whether any change in parameters is required or not. If there is no related configuration then the message is passed back (relayed) to the SS7 stack 202 CAP layer over a standard software process communication interface. (E.g. Message Queue) The CAMEL HUB core logic 212 also generates the EDR 218 and trace for this message by trace server 222. Likewise, a CDR 218 is generated for a complete call involving different CAMEL messages.

Similarly, in a modification mode the application CAMEL HUB core logic 212 searches the database 214 for the received message (e.g. Initial DP Message). The search results into a relationship configured for X & Y operators and one or more feature is defined for the same. For e.g., the feature can be parameter modification i.e. modifying the called party Binary-Coded Decimal (BCD) number which is part of Initial DP message. The user Interface module 220 (GUI) helps in configuring the required modification value. The CAMEL HUB core logic 212 decodes the Initial DP message and applies the modification in parameters as per the configuration done via GUI. Subsequently the CAMEL HUB core logic module 212 encodes this message and forwards the encoded message to the SS7 stack 202 CAP layer over a standard software process communication interface. (E.g. Message Queue). It should be noted that the SS7 stack 202 is a standard protocol having layers as MTP1, MTP2, MTP3, SCCP, TCAP, ISUP, and MAP & CAP. The MTP1 is the lowest layer and ISUP/MAP/CAP belongs to the application. The CAMEL HUB core logic 212 also generates the EDR 218 and Trace for this message. Likewise, a CDR 218 is generated for a complete call involving different CAMEL messages. Also, the CAMEL HUB core logic 212 changes the (TT) to value 0 in both of the above cases before forwarding to the SS7 stack 202. Finally the SS7 stack 202 sends the CAP message (Initial DP) back to STP 114 via the SS7 interface card 208. The STP 114 further forwards the CAP message to SCP of the HPLMN.

The HPLMN responds back with another CAMEL RRBE message (e.g. requestreportBCSMevent) which is sent to VPLMN via the STP 114 and CAMEL HUB 112 system using the above 2 procedures. In this way the communication continues till the completion of call.

Similarly the MAP messages like Location Update/SMS are also passed through the CAMEL HUB & STP wherein the CAMEL HUB may change the CAMEL Phase as the case may be. (Lower to Higher or Vice-Versa).

Although, the example embodiment has been described above with reference to FIG. 2, it may be appreciated that the disclosed processing of message may be extended to other messages as illustrated in FIGS. 3, 4, 5, 6, 7, 8, 9, 10, 11 and 12. However, it may also be noted that the processing of message by the CAMEL HUB 112 depends upon the type of mode of message processing (i.e. relay modification. The O&M module 206 essentially performs 2 important functions which include CAMEL HUB system start-up and shut-down and system monitoring.

The system monitoring includes signaling system 202, CAMEL HUB application components, Database, O&M modules. In case, any of these goes down, the O&M 206 takes corrective actions.

CAMEL HUB Capabilities:

The CAMEL HUB has capabilities which include various scenarios explained herein for better understanding. The CAMEL HUB capabilities include cross phase roaming from higher CAMEL phase to lower CAMEL phase, cross phase roaming from lower CAMEL phase to higher CAMEL phase, message change to remove incompatibility and parameter addition/change to remove incompatibility. Further, mentioned capabilities may involve other configurations as well which are described in further detail below.

Typically the CAMEL services are defined in four phases such as Phase1, phase2, phase3 and phase4 wherein each phase is in connection with the previous phase. Phase1 and 2 were defined before 3G (third generation) networks were specified. The 3G networks are typically network protocols supporting much higher data rates generally measured in Mbps and are intended for applications other than voice. The Phase1 and 2 adds intelligent network (IN) services to a GSM network, although they are equally applicable to 3G or lesser networks. Intelligent network services as referred for phase 1 and 2 are services that allow operators to differentiate themselves by providing value-added services in addition to the standard telecom services. Intelligent network is based on the signaling system 7 (SS7) protocol between telephone network switching centers and other network nodes owned by network operators. Whereas Phase3 defines third generation partnership protocol (3GPP) which is a standard system utilized in High-Speed Wireless Networking system development and specification.

All the phases are further described in detail below:

CAMEL Phase1 defines very basic call control services and introduces the concept of a CAMEL Basic call state model (BCSM) to the Intelligent Network (IN). Phase1 have the ability to bar calls (release the call prior to connection);

allow a call to continue unchanged, or to modify a limited number of call parameters before allowing it to continue. Phase1 also monitors the status of a call for certain events (i.e. call connection and disconnection), and take appropriate action on being informed of the event.

CAMEL Phase2 enhances the capabilities defined in Phase 1. In addition to supporting the facilities of Phase1, Phase2 includes additional event detection points such as Interaction between a user and a service using announcements, voice prompting and information collection via in-band interaction or unstructured supplementary service data (USSD) interaction; control of call duration and transfer of advice of charge information to the mobile station; information about the invocation of the supplementary services explicit call transfer (ECT), call deflection (CD) and multi-party calls (MPTY) and easier post-processing, charging information from a serving node can be integrated in normal call records.

CAMEL Phase3 enhances the capabilities of phase2 and therefore includes additional capabilities which are: support of facilities to avoid overload; capabilities to support dialled services; capabilities to handle mobility events, such as (not-) reachability and roaming; control of general packet radio service (GPRS) sessions and packet data protocol (PDP) contexts; control of mobile originated SMS through both circuit switched and packet switched serving network entities; interworking with support of localised service srea (SoLSA).

CAMEL Phase4 is put together on the capabilities, of phase3 and defines the features as:

Optimal routing of circuit-switched mobile-to-mobile calls; the capability to create additional parties in an existing call (call party handling); The capability for to create a new call unrelated to any other existing call (call party handling—new call); capabilities for the enhanced handling of call party connections (call party handling); control of mobile terminated SMS through both circuit switched and packet switched serving network entities; The capability to control sessions in the IP multimedia subsystem (IMS).

Cross Phase Roaming from Higher to Lower CAMEL Phase

Consider an operator 1 belongs to CAMEL phase X and operator 2 belongs to CAMEL phase Y. Let us assume a scenario where there are two operators and are not able to provide proper services to their roamer because of the difference or variations in their CAMEL phases. These variations would lead to a condition where a subscriber from CAMEL phase3 networks roams to a lower CAMEL phase network might not get Mobile originated short message service (MO-SMS) facility as there is no provision of online charging of SMS in a CAMEL phase2 network. Similarly, in another scenario, when a CAMEL phase2 subscriber goes to a CAMEL phase3 networks, the subscriber would not be able to use the online SMS charging features. Similar cases may arise with online GPRS charging scenarios. FIGS. 3 to 12 illustrate message flows described along with pre-conditions and assumptions from network configurations includes majorly five categories of message (also called CAMEL messages): location update, location update for general packet radio system, mobile originated/mobile terminated short message service, mobile originated/mobile terminated voice calls and general packet radio system session flow (GPRS, MO/MT SMS, MO/MT voice calls, and GPRS session flow).

Location Update

Figure 3:
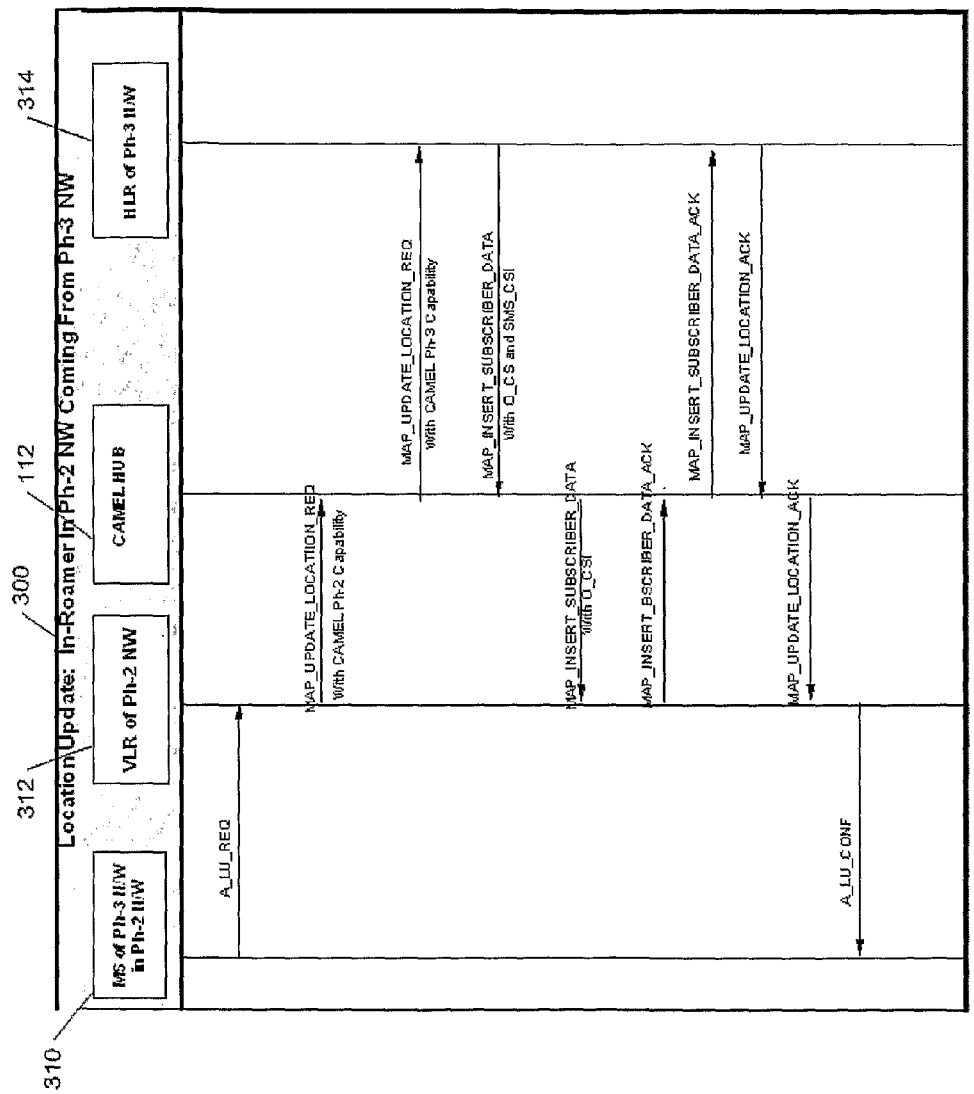
FIG. 3 describes the CAMEL HUB capabilities during cross phase roaming for location update from phase3 network to phase2 network.

Location update involves communication of CAMEL messages in a cross phase roaming scenarios of an in-roamer, such as, location update from phase3 to phase2, location update from phase2 to phase1 and location update from phase3 to phase. FIG. 3 shows a scenario of location update procedure of an in-roamer coming from a CAMEL phase3 network to a CAMEL phase2 network. The flow of messages (commands) between various communication devices have been indicated in FIG. 3 by arrows. The CAMEL HUB 112 plays an important role in changing the visited location register (VLR) capability parameter of Location Update (LU) message along with other activities to achieve phase independent roaming. The CAMEL HUB processes the received messages form VLR in a similar manner as explained supra with reference to FIG. 2. It may be noted that the blocks shows in FIGS. 3 to 12 correspond to a communication device in a particular CAMEL phase. For example, FIG. 3 shows a block 310 that corresponds to mobile station (MS) 310 of a phase3 network 310 that tries to latch in a phase2 network. The MS of phase3 network 310 sends a Location Update request i.e. (A_LU_REQ) to VLR of phase2 network 312. The VLR of phase2 network further sends location update request (MAP_UPDATE_LOCATION_REQ), which is a MAP (mobile application part) message, with CAMEL ph-2 capability to CAMEL HUB 112. The CAMEL HUB 112 updates location request and forward the MAP_LOCATION_REQ with CAMEL ph-3 capability to a HLR of phase3 network 314 in a similar manner as explained supra with reference to FIG. 2.

The HLR of phase3 network 314 receives the MAP_LOCATION_REQ from CAMEL HUB 112 and updates the location. The HLR of phase3 network 314 sends subscriber data (in the form of MAP Insert Subscriber Data message) with Originating CAMEL Subscription Information (O_CSI) and Short Message Service CAMEL Subscription Information (SMS_CSI) to CAMEL HUB 112. The CAMEL HUB 112 truncates the SMS-CSI information and further sends the subscriber data message with O-CSI to VLR of phase2 network 312. The acknowledgement of map subscriber data is sent to CAMEL HUB 112.

The CAMEL HUB 112 further sends the MAP insert subscriber data acknowledgement to HLR of phase3 network 314. The HLR of phase3 network 314 further sends an acknowledge for location update to CAMEL HUB 112 which on receipt of acknowledgment from HLR of phase3 network 314 sends further MAP update location acknowledgement to VLR of phase2 network 312. The VLR of phase2 network 312 further sends the Location Update Confirm message to MS of phase3 network in phase2 network 310.

In another example, a location update may be initiated by an in-roamer coming to CAMEL phase1 network from CAMEL phase2 network. The CAME HUB 112 functions in a similar manner as explained supra with reference to FIG. 2. For example, while changing the VLR capability of LU message along with other activities to achieve the phase independent roaming, CAMEL HUB 112 changes the Insert Subscriber Data (ISD) coming from phase2 HLR into phase1 compatible ISD. The location update to CAMEL phase1 network coming from CAMEL phase2 network involves similar process as for location update of phase3 network to phase2 network. The MS of phase3 network in phase2 network 310, VLR of phase2 network 312 and HLR of phase3 network 314 gets replaced with MS of phase2 network in phase1 network, VLR of phase1 network and HLR of phase2 network. The CAMEL HUB 112 is placed in similar manner as for location update for a MS from phase3 to phase2. The processing of request from MS of phase2 network in phase1 network follows similar steps to VLR of phase1 network, CAMEL HUB and HLR of phase2 network as explained for location update for phase3 to phase2.

In yet another scenario, a location update may be initiated by an in-roamer coming to CAMEL phase1 network from CAMEL phase3 network. CAMEL HUB 112 functions in a similar manner as explained supra with reference to FIG. 2.

The CAMEL HUB 112 therefore plays an important role in providing phase independent roaming while changing VLR capability of LU message along with other activity in a similar. The MS of phase3 network in phase2 network 310, VLR of phase2 network 312 and HLR of phase3 network 314 gets replaced with MS of phase3 network in phase1 network, VLR of phase1 network and HLR of phase3 network. The CAMEL HUB 112 is placed in similar manner as for location update for phase3 to phase2. The processing of request from MS of phase3 network in phase1 network follows similar steps to VLR of phase1 network, CAMEL HUB and HLR of phase3 network as explained for location update for phase3 to phase2.

Location Update for GPRS

The location update for GPRS includes various scenarios of an in-roamer such as location update for GPRS from phase3 to phase2, location update for GPRS from phase2 to phase1 and location update for GPRS from phase3 to phase1. These location updates for GPRS are further explained in detail below.

Figure 4:
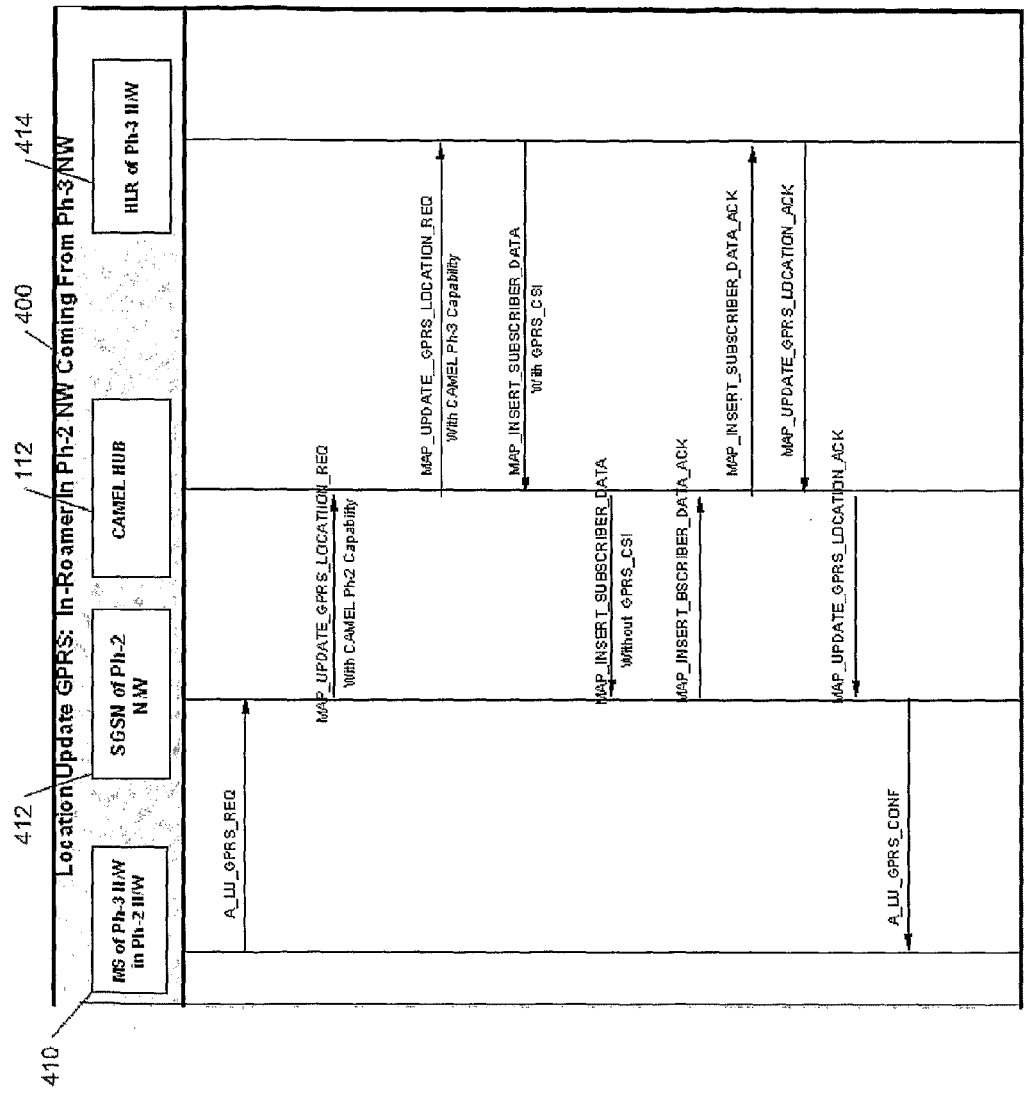
FIG. 4 illustrates role of CAMEL HUB capabilities during cross phase roaming for location update for GPRS users from phase2 network to phase1 network.

FIG. 4 illustrates CAMEL HUB capabilities during cross phase roaming for location update for GPRS users of phase3 network coming to phase2 network. The Location Update GPRS procedure of an In-Roamer coming to CAMEL phase2 network from CAMEL phase3 network has been shown in the form of message flow diagram.

A MS of phase3 network in phase2 network 410 sends a Location Update GPRS request to SGSN (Serving GPRS support node) of phase2 networks 412. The SGSN of phase2 network 412 is responsible for the delivery of data packets from and to the mobile stations within its geographical service area. The SGSN of phase2 network 412 sends the request for MAP update GPRS location update request with CAMEL phase2 capability to CAMEL HUB 112. The CAMEL HUB 112 functions in a similar manner as explained supra with reference to FIG. 2. The CAMEL HUB 112 changes the supported CAMEL phase in LU GPRS request to phase3 and sends it to HLR of phase3 network 414, while the LU GPRS request received by CAMEL HUB 112 would have phase2.

CAMEL HUB 112 will not change the SGSN address in the LU message sending towards HLR of phase3 network 414. The CAMEL HUB 112 stores the GPRS CSI information (like: service key, Trigger Detection Point (TDP) list, Service control function (SCF) addr and default handling etc.) received from HLR of phase3 network 414. The CAMEL HUB 112 will not send GPRS CSI to SGSN of phase2 network 412. The CAMEL HUB 112 will also receive GPRS subscription data from HLR of phase3 network 414 and send it to SGSN of phase2 network 412. The request confirmation for phase independent roaming is sent to MS of phase3 network in phase2 network 410.

In yet another scenario, a location update for GPRS users is initiated by an in-roamer coming from CAMEL phase2 network to CAMEL phase1 network. The flow diagram (not shown in FIG. 4) and the flow of instructions would be similar with changes in the functional block. For instance, MS of phase3 network in phase2 network 410, SGSN of phase2 network 412 and HLR of phase3 network 414 are replaced with MS of phase2 network in phase1 network, SGSN of phase1 network and HLR of phase2 network respectively.

The CAMEL HUB 112 similarly changes the supported CAMEL phase in LU request to phase2 and sends it to HLR of phase2 network. The CAMEL HUB 112 will not change the SGSN address in the LU message sending towards HLR of phase2 network.

In yet another scenario, the CAMEL HUB 112 receives CAMEL Subscriber Information (CSI) which is not applicable in Phase1 network. The CAMEL HUB 112 does not send the CSI to SGSN of phase1 network. The location update for GPRS users of an in-roamer coming from phase3 network to CAMEL phase1 network would be similar with changes in the phases of the functional blocks. The CAMEL HUB 112 similarly changes the CAMEL Phase capability from Phase1 to Phase3 in the Location Update (LU) message and forwards it to HLR of phase-3 network. The CAMEL HUB 112 will not change the SGSN address in the LU message. The CAMEL HUB 112 acts as a virtual SGSN in order to achieve phase-independent roaming.

The CAMEL HUB 112 stores all CSI information (like SCF address, service key, default handling parameters etc.). The CAMEL HUB 112 stores the GPRS_CSI info (like: service key, TDP list, SCF addr and default handling etc.) and will not send GPRS-CSI to SGSN. The CAMEL HUB 112 also receives GPRS subscription data from HLR of phase3 network and sends it to SGSN of phase1 network. The CAMEL to HUB 112 receives the subscriber data in the form of MAP Insert Subscriber Data (ISD) message.

MO/MT SMS

The initiation of MO/MT SMS in a cross phase roaming that includes various scenarios such as MO/MT SMS from phase3 to phase2, MO/MT SMS from phase2 to phase1, and MO/MT SMS from phase3 to phase1. These location updates for MO/MT SMS in various locations are further explained in detail below.

Figure 5:
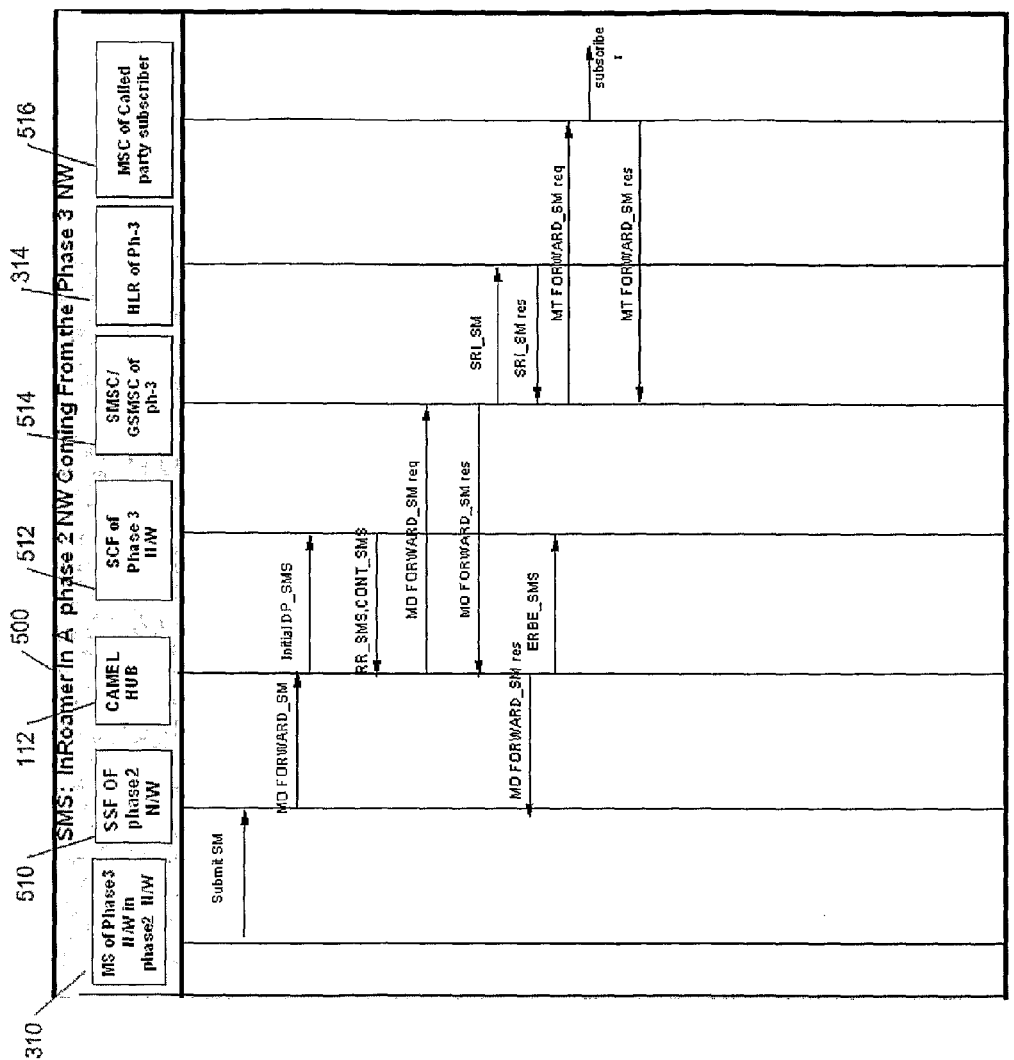
FIG. 5 illustrates role of CAMEL HUB capabilities during cross phase roaming for location update for MO/MT SMS.

FIG. 5 illustrates the CAMEL HUB capabilities during cross phase roaming from a Phase-3 network to a Phase-2 network for MO/MT SMS (mobile originated/mobile terminated short message service). The MO/MT SMS typically includes short text messages from a mobile device. The mobile device and the associated carrier's network support this feature.

As shown in FIG. 5, the functional blocks include a MS of phase3 network in phase2 network 310, Service Switching Function (SSF) 510, CAMEL HUB 112, Service control function (SCF) of phase3 network 512, (SMSC/GMSC) gateway mobile switching centre and short message service centre of phase3 514, HLR of phase3 314 and MSC of called party subscriber 516.

The CAMEL HUB 112 takes care of the online charging of the MO SMS and functions in a similar manner as explained supra with reference to FIG. 2. The CAMEL HUB 112 is situated between MSC of phase2 network and SCF of phase3 network and handles all messages related to MO SMS.

The MS of phase3 network in phase2 network 310 submits SM to SSF of phase2 network 510. The SSF of phase2 network 510 forwards the mobile originated message to the CAMEL HUB 112. The CAMEL HUB 112 uses the SMS-CSI, saved during the Location Update procedure, to make the initial DP_SMS (IDPSMS) CAMEL message. The CAMEL HUB 112 then forwards the initial DP_SMS to SCF of phase3 network 512. This flow shown in FIG. 5 also describes the MT SMS flow in which CAMEL HUB will not come into picture.

In a scenario when an in-Roamer initiates a mobile originated SMS, while roaming in phase1 network, coming from phase2 network. The CAMEL HUB 112 takes care of the online charging of the MO SMS and functions in a similar manner as explained supra with reference to FIG. 2. The CAMEL HUB 112 will be situated between MSC of phase1 network and SCF of phase2 network and will handle all messages related to MO SMS. This flow also describes the MT SMS flow, in which, the CAMEL HUB 112 will not come into picture. This corresponds to the case when a subscriber moves from one network to another network, where both networks are of different phases. An INIT_DP message is sent by CAMEL HUB 112 to SCF of phase2 after receiving the Mo Forward SM message from SSF of phase1 network. The called party number in INIT_DP message should be a special number provided by the HPLMN operator.

A special service should be defined for this special number in the SCF of Home Public Land Mobile Network (HPLMN). With the help of this service, deduction of a SMS charge will be done from the MO subscriber's balance when Event Report BCSM (ERB) (o-ans) will be received by SCF. The service should also have the feature that if SCF receives ERB (disconnect), then SCF should credit the charge deducted from subscriber's balance (this would be the case when Mobile originated—Forward Short Message ((MO-FSM) fails). The CAMEL HUB 112 will send ERB (disconnect) when MO-FSM fails (SMS is not submitted to SMSC). After successful submission of msg to its service center, CAMEL HUB (CH) sends ERB with o_ans to phase2 SCF.

In yet another example scenario, an in-roamer initiates a Mobile Originated SMS, roaming in phase1 network, coming from phase3 network. The CAMEL HUB 112 will function in a similar manner as explained supra with reference to FIG. 2. The CAMEL HUB 112 is situated between mobile switching center (MSC) of phase1 network and SCF of phase3 network and will handle all messages related to MO SMS in a similar manner as explained above. This flow also describes the MT SMS flow in which CAMEL HUB will not come into picture. This is the case when subscriber moves from one network to another network, where both networks are of different phase INIT_DP_SMS sent For Phase3 CH generates the INIT_DP_SMS for charging in response of MO Forward SM msg received. After successful submission of msg to service center, CH send the ER_SMS with SUBMIT dp to phase3 SCF. In case of failure of submission of message in MO FORWARD_SM res ERBE_SMS with failure dp is sent.

MO/MT Voice Calls

The initiation of MO/MT call in a cross phase roaming includes various scenarios such as MO/MT call from phase3 to phase2, MO/MT call from phase2 to phase1 and MO/MT call from phase3 to phase1. These location updates for MO/MT call in various locations are further explained in detail below.

Figure 6:
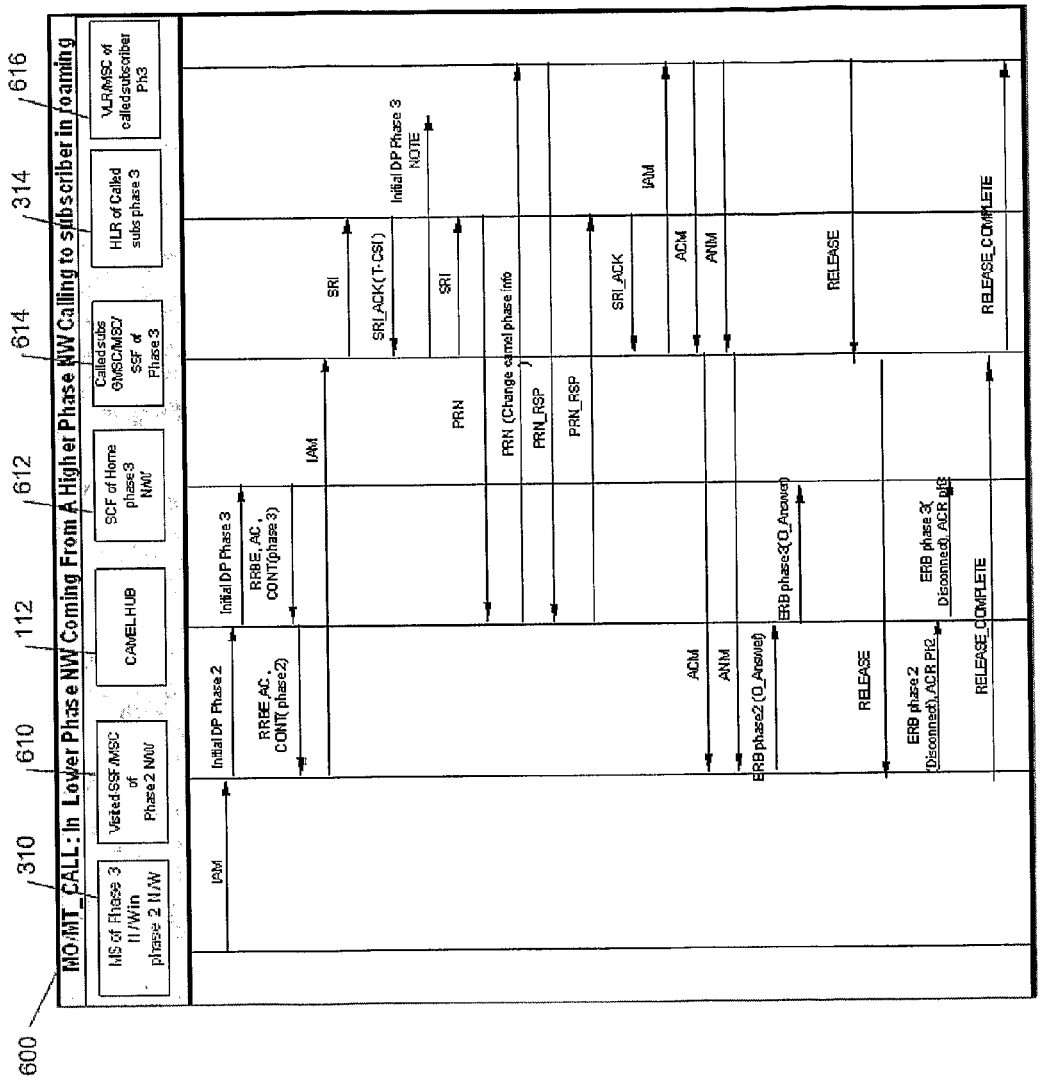
FIG. 6 illustrates role of CAMEL HUB capabilities during cross phase roaming for MO/MT call from phase3 network to phase2 network.

FIG. 6 illustrates role of CAMEL HUB capabilities during cross phase roaming for MO/MT call from phase3 network to phase2 network. When in-roamer initiates a Mobile Originated (MO) call, roaming in phase2 network, coming from phase3 network, the CAMEL HUB 112 takes care of phase difference between home and visited network.

The functional blocks to manage the flow of information from phase3 network to phase2 network are: MS of phase3 network 310, visited SSF/MSC of phase2 network 610, CAMEL HUB 112, SCF of home phase3 network 612, called subs Gateway Mobile Switching Center/mobile switching center/service switching function (GMSC/MSC/SSF) of phase3 network 614, HLR of called subs phase3 network 314 and VLR/MSC of called subscriber phase3 network 616. The figure explains the scenario when the subscriber of phase3 network comes in phase2 network and tries to call its home network subscriber (called subscriber is in its own home network).

The CAMEL HUB 112 is placed between visited SSF/MSC of phase2 network 610 and SCF of home phase3 network 612. The CAMEL HUB 112 functions in a similar manner as explained with reference to FIG. 2. The flow as shown in FIG. 6 also shows the MT call flow and termination of call. However, it is to be noted that for all the call related scenarios, home signal control point (SCP) will be controlling the call and will handle the low balance, zero balanced account as per the logic implemented in the SCP.

In yet another example scenario, an In-roamer initiates a mobile originated call, roaming in phase1 network, coming from phase2 network, the CAMEL HUB 112 takes care of phase difference between home and visited network by functioning in a similar manner as explained supra with reference to FIG. 2. The functional blocks which functions for such a scenario include: MS of phase2 network in phase1 network, visited SSF/MSC of phase1 network, CAMEL HUB, SCF of home phase2 network, called subs GMSC/MSC/SSF of phase2, called subs HLR of phase2 and VLR/MSC of called subscriber phase2. The CAMEL HUB is placed between MSC of phase1 network and SCF of phase2 network and will handle messages related to MO call.

The scenario mentioned above explains the case when the subscriber of phase2 network comes in phase1 network and tries to call its home network subscriber (called subscriber is in its own home network). Since visited network is phase1 where apply charging does not exist, so the CAMEL HUB 112 handles an online charging through its own timer module.

A timer (implemented as timer server 216 as shown in FIG. 2) in CAMEL HUB 112 is started (with timer value received in Apply Charging Request—max call duration) on receiving ERB (O-Answer) from SSF. This timer is stopped on receiving ERB (O-Disconnect) and CAMEL HUB 112 sends apply charging report to SCF with ERB (O-Disconnect). Also, the CAMEL HUB 112 starts another delta timer after sending apply charging report (ACR) to SCF so that the duration between the ACR and next apply charging request is charged. In case, CAMEL HUB 112 gets ERB (disconnect) before the timer expiry, the CAMEL HUB will stop timer and send ACR with ERB (disconnect).

Further, in yet another scenario, an in-roamer initiates a mobile originated call, roaming in phase1 network; coming from phase3 network, the CAMEL HUB 112 will take care of phase difference between home and visited network. In such a case, the CAMEL HUB 112 is placed between MSC of phase1 network and SCF of phase3 network and handles messages relating to MO call.

This is the case when subscriber of phase3 network comes in phase1 network and tries to call its home network subscriber (called subscriber is in its own home network). The functional blocks involved in such a scenario are: MS of phase3 network in phase1 network, visited SSF/MSC of phase1 network, CAMEL HUB, SCF of home phase3 network, called subs GMSC/MSC/SSF of phase3, HLR of called subs phase3, HLR of called subs phase3 and VLR/MSC of called subscriber phase3.

Since visited network is phase1, which apply charging, does not exist in such a situation, so the CAMEL HUB 112 functions in a similar manner as explained supra by handling the online charging through its own timer module. CAMEL HUB 112 will get the timer value in apply charging request and it will be started after receiving ERB (o-Answer) from visited SSF. In such a situation, when CAMEL HUB 112 receives ERB with O-answer from SSF, a timer is started on CAMEL HUB 112 with the timer value received in Apply charging request (which would be the max allowed call duration).

When CAMEL HUB 112 receives ERB (o-Disconnect), timer is stopped and CAMEL HUB 112 sends apply charging report to SCF with ERB (disconnect). CAMEL HUB 112 further starts the timer and provides timer value to timer module. When this timer expires, then CAMEL HUB will send ACR to SCF of home network of calling subscriber and starts a delta timer so that the duration between the apply charging report (ACR) and next apply charging request (ACR) also gets charged. In case CAMEL HUB gets ERB (disconnect) before the timer expiry, it will stop timer and send ACR with ERB (disconnect).

GPRS Session Flow:

The initiation of GPRS session flow in a cross phase roaming includes various scenarios such as GPRS session flow from phase3 to phase2, GPRS session flow from phase2 to phase1 and GPRS session flow from phase1 to phase1. These GPRS session flow in various scenarios are further explained in detail below.

Figure 7:
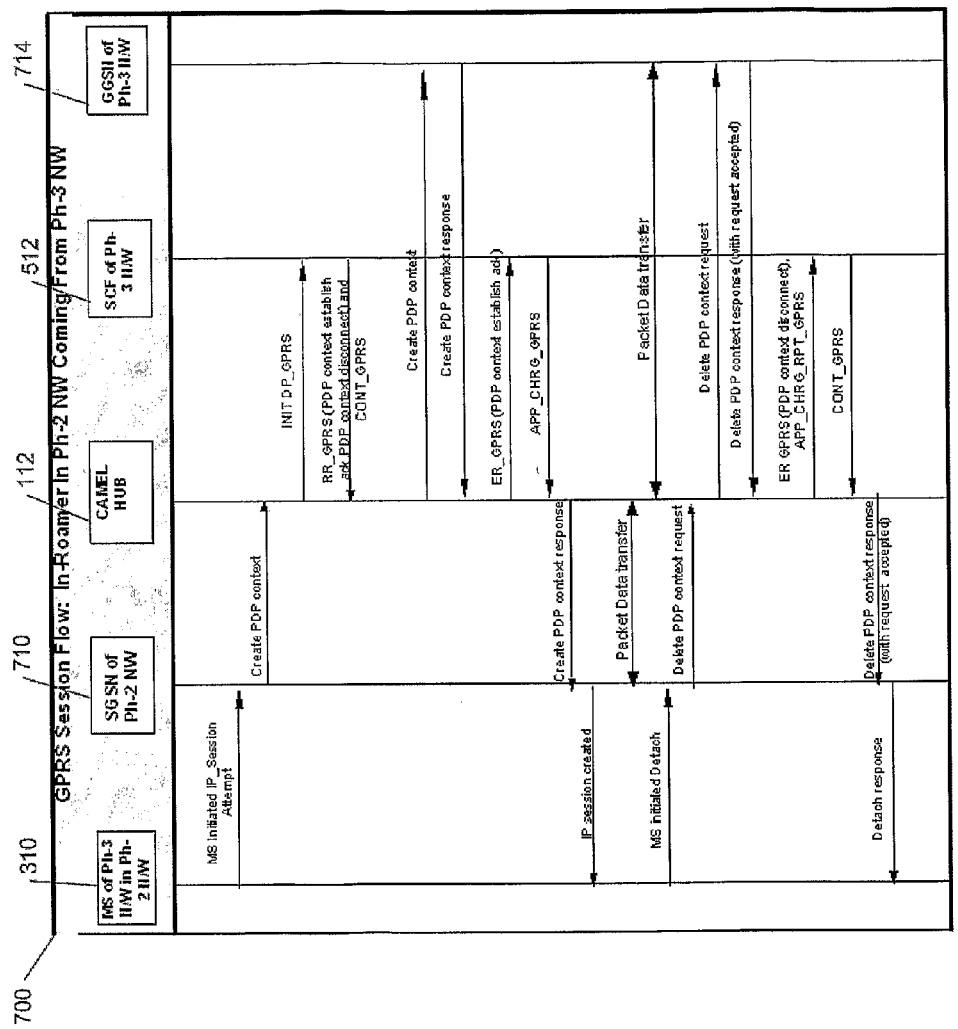
FIG. 7 illustrates role CAMEL HUB capabilities during cross phase roaming for GPRS session flow when a subscriber roams from phase3 network to phase2 network.

FIG. 7 illustrates role CAMEL HUB capabilities during cross phase roaming for GPRS session flow when a subscriber roams from phase3 network to phase2 network. In a situation when a subscriber roams in CAMEL phase2 network coming from CAMEL phase3 network and tries to attempt for an IP Session CAMEL HUB 112 comes in the scenario in similar manner as explained supra with reference to FIG. 2 and takes care of the GPRS PDP session posing as SGSN and gateway GPRS support node (GGSN). Also it caters to the all CAMEL messages required for online charging for the usage of GPRS services by the in-roamer. As shown in FIG. 7 various functional blocks include MS of phase3 network in phase2 network 310, SGSN of phase2 network 710, CAMEL HUB 112, SCF of phase3 network 512 and GGSN of phase3 network 714. The flow of information among mentioned function blocks can be referred from the FIG. 7.

In this case the subscriber moves from Phase3 to Phase2 network and uses GPRS services. SGSN makes a query to know the IP address of GGSN with its own DNS. DNS query response further consists of an IP address of CAMEL HUB 112. The CAMEL HUB 112 further sends IDP GPRS to SCF and SCF returns to continue_GPRS. The CAMEL HUB 112 sends a query to the DNS for the actual GGSN IP address and sends create PDP context to GGSN address received earlier in DNS response. After receiving create PDP context response, the CAMEL HUB 112 sends the ER_GPRS with event PDP context established ack. The CAMEL HUB 112 further maintains a timer, which is started after receiving APP_CHRG_GPRS (apply charging). This timer is stopped when it either expires or CAMEL HUB receives delete PDPc. Request. The GPRS session is therefore created and packet data is transferred through this IP channel.

In another example scenario, a subscriber roams in CAMEL phase1 network coming from CAMEL phase2 network and tries to attempt for an IP Session. The CAMEL HUB 112 comes in the scenario in a similar manner as explained supra and takes care of the GPRS PDP Session posing as SGSN and GGSN. Also it caters to the all CAMEL messages required for online charging for the usage of GPRS services by the In-Roamer. The functional blocks involved in such a case are MS of phase2 network in phase1 network, SGSN of phase1 network, CAMEL HUB, SCF of phase2 network and GGSN of phase2 network. In this case, the subscriber moves from Phase2 to Phase1 network and uses GPRS services. The SGSN makes a query to know the IP address of GGSN with its own DNS. DNS query response includes an IP address of CAMEL HUB 112. SGSN therefore sends Create PDP context to CAMEL HUB 112. CAMEL HUB 112 further sends IDP to the SCF of the subscriber. The IDP would have a special number provided by the HPLMN operator and a separate service defined on that number so that SCF can send APP_CHRG (apply charging request) to SSF to control charging.

CAMEL HUB 112 makes a query to know the actual GGSN IP address according to Access point name (APN) with DNS by sending create PDP context request to GGSN on the IP address found in DNS query response. After receiving create PDP context response, the CAMEL HUB sends ERB (O-Ans) to the SCF of phase2 network. The APP_CHRG request is received at CAMEL HUB 112 from SCF. The CAMEL HUB 112 therefore starts a timer with timer value received in APP_CHRG. This timer stops when it either expires or Delete PDP context request received by CAMEL HUB 112. The GPRS session is created and packet data is transferring through this IP channel. Further, the MS initiates detach request and SGSN send Delete PDPc. Request to CAMEL HUB and CAMEL HUB sends it to actual GGSN. When actual GGSN sends delete PDPc response with request accepted to CAMEL HUB, ERB with disconnect sends to SCF and pending APP_CHRG_RPT is also sent to SCF. CAMEL HUB with send Delete PDPc. Response back to SGSN. Further, in another scenario when a subscriber roams in CAMEL phase1 network coming from CAMEL phase3 network and tries to attempt for an IP Session CAMEL HUB comes in the scenario in a similar manner as explained supra with reference to FIG. 2 and takes care of the GPRS PDP Session posing as SGSN and GGSN. Also, it caters to the all CAMEL messages required for online charging for the usage of GPRS services by the in-roamer.

The various functional blocks involved in such a case are MS of phase3 network in phase1 network, SGSN of phase1 network, CAMEL HUB, SCF of phase3 network and GGSN of phase3 network. The flow of instructions to functional blocks is similar as explained for functional block mentioned in FIG. 7 for phase3 network to phase2 network.

In this case, subscriber moves from Phase3 to Phase1 network and uses GPRS services. The SGSN makes a query to know the IP address of GGSN with its own DNS. The DNS query response includes the IP address of CAMEL HUB 112. The SGSN therefore sends Create PDP context to CAMEL HUB 112. The CAMEL HUB 112 then sends IDP_GPRS to the SCF of the subscriber.

CAMEL HUB 112 makes a query to know the actual GGSN IP address according to APN and further sends Create PDP context request to GGSN on the IP address found in DNS query response. After Receiving Create PDP context response, the CAMEL HUB 112 sends ER_GPRS with event PDP context, which establishes ack to SCF of phase3 network. The CAMEL HUB 112 also starts a timer, when it gets APP_CHRG_GPRS and this timer is stopped when it expires or a disconnect is received by CAMEL HUB. The GPRS session is created and Packet Data is transferred through this IP channel. Further, the PDP context disconnect event is generated, when Delete PDPc. Request is received by CAMEL HUB 112.

Cross Phase Roaming (Lower to Higher CAMEL Phase),

The CAMEL phase roaming from lower to higher phase includes similar scenarios as discussed under cross phase roaming for higher to lower CAMEL phase. This scenario majorly includes location update, location update for GPRS, MO/MT SMS, MO/MT voice calls and GPRS session flow. These and other scenarios are further covered in detail below.

Location Update in a Cross Phase Roaming:

The location update in a cross phase roaming includes various scenarios of an in-roamer such as location update from phase2 to phase3, location update from phase1 to phase2 and location update from phase1 to phase3. The location updates are further explained in detail below.

Figure 8:
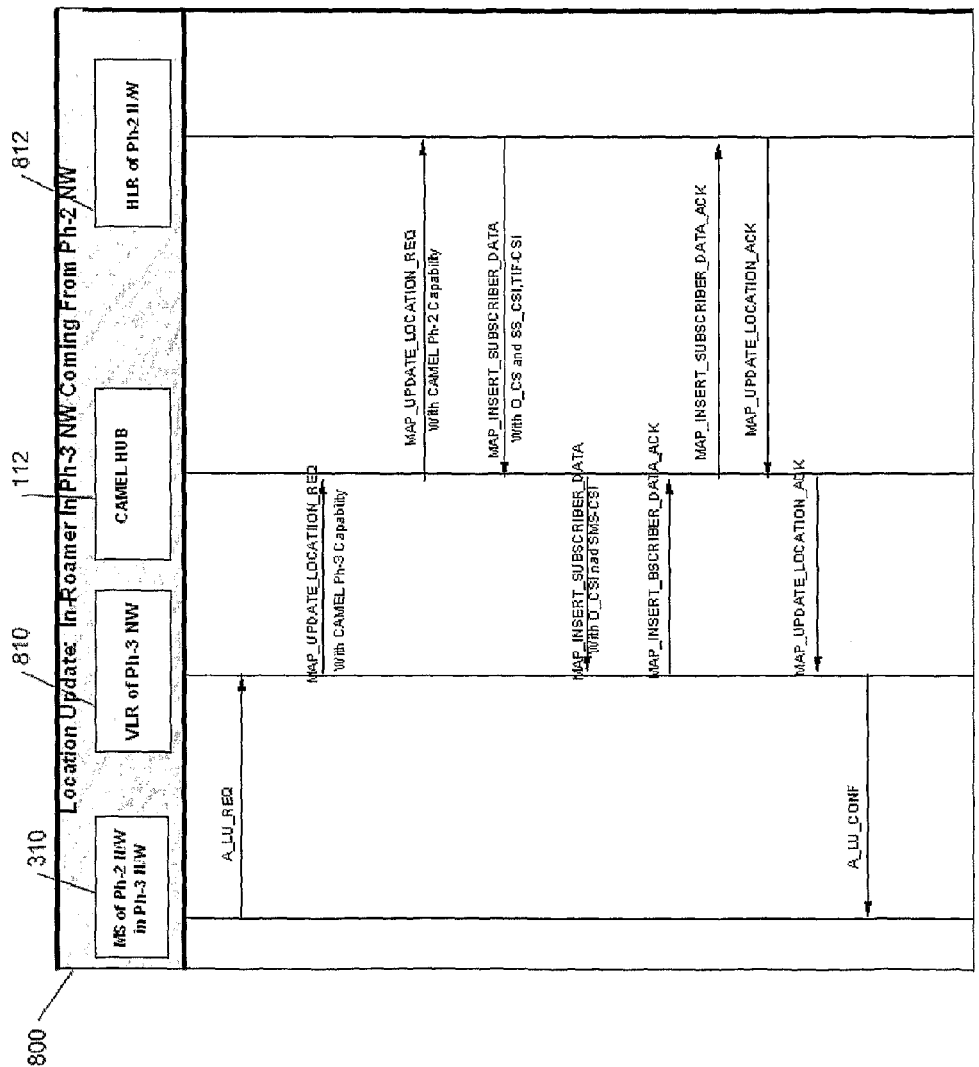
FIG. 8 illustrates the cross phase roaming for lower to higher CAMEL phase for location update during phase3 coming from phase2.

FIG. 8 illustrates the cross phase roaming of lower CAMEL phase to higher CAMEL phase for location update when MS from phase2 network is coming in phase3 network. The CAMEL HUB 112 plays an important role in changing the VLR capability of LU message, along with other activities to achieve the phase-independent roaming. As shown in FIG. 8, various functional modules include MS of Phase-2 network in Phase-3 network 310, VLR of phase-3 network 810, CAMEL HUB 112 and HLR of Phase-2 network 812.

The flow of instructions among various functional blocks is explained in the FIG. 8. The CAMEL-HUB 112 functions in a similar manner as explained supra with reference to FIG. 2 and changes the ISD coming from Phase2 HLR into Phase3 Compatible ISD. The CAMEL HUB 112 generates the SMS-CSI having parameter: Tdb data list→sms_trigger_detection_point:→SMS_COLLECTED_INFO Service key→same as O-CSI's service key received from HLR Scf_address→actual SCF address Default_sms_handling: release Extension: not used CAMEL_capability_handling: phase information (1, 2, and 3) Extension: not used notification_to_cse: not used csi_active: not used.

In yet another scenario, the In-Roamer comes to CAMEL phase2 network from CAMEL phase1 network. The CAMEL HUB 112 plays an important role in changing the VLR capability of LU message, along with other activities to achieve the phase-independent roaming. The various functional component involved in such scenario are MS of Phase-1 network in Phase-2 network, VLR of phase-2 network, CAMEL HUB 112 and HLR of Phase-1 network. The CAMEL HUB 112 changes the ISD coming from Phase1 HLR into Phase2 Compatible ISD.

The flow of instructions among these functional blocks remains similar to as mentioned in the FIG. 8. The only difference lies among the scenario mentioned in FIG. 8 is referencing network phases among functional blocks which have been mentioned in specification.

Figure 9:
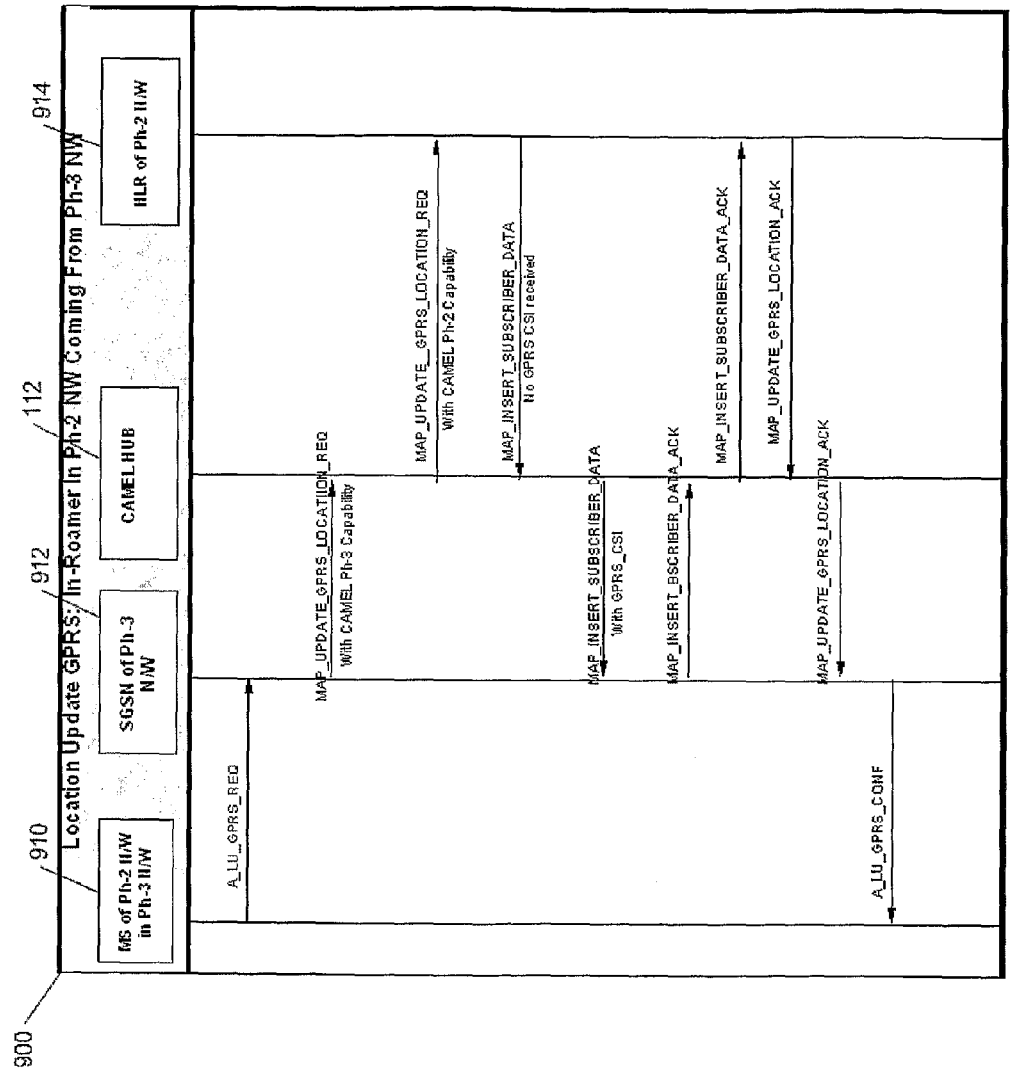
FIG. 9 illustrates the location update for GPRS during phase3 coming from phase2.

Further, there is another scenario wherein an In-Roamer comes to CAMEL phase3 network from CAMEL phase1 network. In such a situation, CAMEL HUB 112 plays an important role in a similar manner as explained supra with reference to FIG. 2 for changing the VLR capability of LU message, along with other activities to achieve the phase-independent roaming. The functional component therefore would be similar to as it has been explained for FIG. 8 & the difference would involve in referring changing in location for specific functional block. The functional blocks involved are MS of Phase1 network in Phase3 network, VLR of Phase3 network, CAMEL HUB and HLR of Phase1 network. The CAMEL HUB 112 changes the ISD coming from Phase1 HLR into Phase3 Compatible ISD CAMEL HUB 112 self generates the SMSCSI having parameter:

Tdb data list→sms_trigger_detection_point:→SMS_COLLECTED_INFO Service key→received in O-CSI Scf_address→actual SCF address Default_sms_handling: release Extension: not used CAMEL_capability_handling: phase information (1, 2, and 3) Extension: not used notification_to_cse: not used csi_active: not used Location Update for GPRS The location update for GPRS includes various scenarios of an in-roamer such as location update for GPRS from phase2 to phase3; location update for GPRS from phase1 to phase2 and location update for GPRS from phase1 to phase3. These location updates for GPRS in various locations are further explained in detail below. FIG. 9 illustrates the location update for GPRS when MS is making LU in phase3 network after coming from phase2 network. The CAMEL HUB 112 functions in a similar manner as explained supra with reference to FIG. 2 and therefore acting as virtual SGSN and changes the SGSN capability of LU GPRS message along with other activities to achieve the phase-independent roaming. The functional component involved is MS of Phase2 network in Phase3 network 910, SGSN of Phase3 network 912, CAMEL HUB 112 and HLR of Phase2 network 914. The flow of instructions among these functional blocks are explained in FIG. 9. The CAMEL HUB 112 changes the supported CAMEL phase in LU request to phase2 and sends it to HLR. The CAMEL HUB 112 does not change the SGSN address in the LU message sending towards HLR. The CAMEL HUB 112 receives GPRS subscription data from HLR and sends it to SGSN and creates GPRS_CSI and further sends it to SGSN. The information, filled in GPRS CSI, includes: TDP list (GPRS attach, attach change of position, PDPc. Establish, PDPc. Estab. Ack., PDPc. Change of position) Service Key: Use stored O-CSI service key from DB at the time of successful LU. SCF address: Actual SCF address stored in DB at the time of successful LU.

In yet another scenario, an In-Roamer conies to CAMEL phase2 network from CAMEL phase1 network. In such a situation CAMEL HUB 112, acting as virtual SGSN and changes the SGSN capability of LU GPRS message along with other activities to achieve the phase-independent roaming in a similar manner as explained supra. The functional blocks involved in such case are MS of Phase1 network in Phase2 network, SGSN of Phase2 network, CAMEL HUB and HLR of Phase1 network. The flow of information among these functional blocks is similar to as shown in FIG. 9. The CAMEL HUB 112 changes the supported CAMEL phase2 to phase1. The CAMEL HUB 112 does not change the SGSN number; it simply sends the actual SGSN number towards HLR. Further, CAMEL HUB 112 stores the SCF address and sends ISD to SGSN.

Further, in another example scenario, an in-roamer coming to CAMEL phase3 network from CAMEL phase1 network. The CAMEL HUB 112 acts as virtual SGSN and changes the SGSN capability of LU GPRS message, along with other activities to achieve the phase-independent roaming. The functional blocks involved in such a situation are: MS of Phase1 network in Phase3 network, SGSN of Phase3 network, CAMEL HUB and HLR of Phase1 network. The flow of information among these functional blocks is similar to as shown in FIG. 9. The CAMEL HUB 112 changes the supported CAMEL phase in LU request to phase1 and sends it to HLR in a similar manner as explained supra. The CAMEL HUB 112 does not change the SGSN address in the LU message sending towards the HLR. The CAMEL HUB 112 receives GPRS subscription data from HLR and sends it to SGSN. In such case, CAMEL HUB will create GPRS CSI itself and sends it to SGSN. The Information, which will be filled in GPRS CSI, is like: TDP list (GPRS attach, attach change of position, PDPc. Establish, PDPc. Estab. Ack., PDPc. Change of position) Service Key: Same as O-CSI service key stored in DB at the time of successful LU. SCF address: Actual SCF address stored in DB at the time of successful LU, Default session handling: Release.

MO/MT SMS

The initiation of MO/MT SMS in a cross phase roaming includes various scenarios such as MO/MT SMS from phase2 to phase3; MO/MT SMS from phase1 to phase2 and MO/MT SMS from phase1 to phase3. These location updates for MO/MT SMS in various locations are further explained in detail below.

Figure 10:
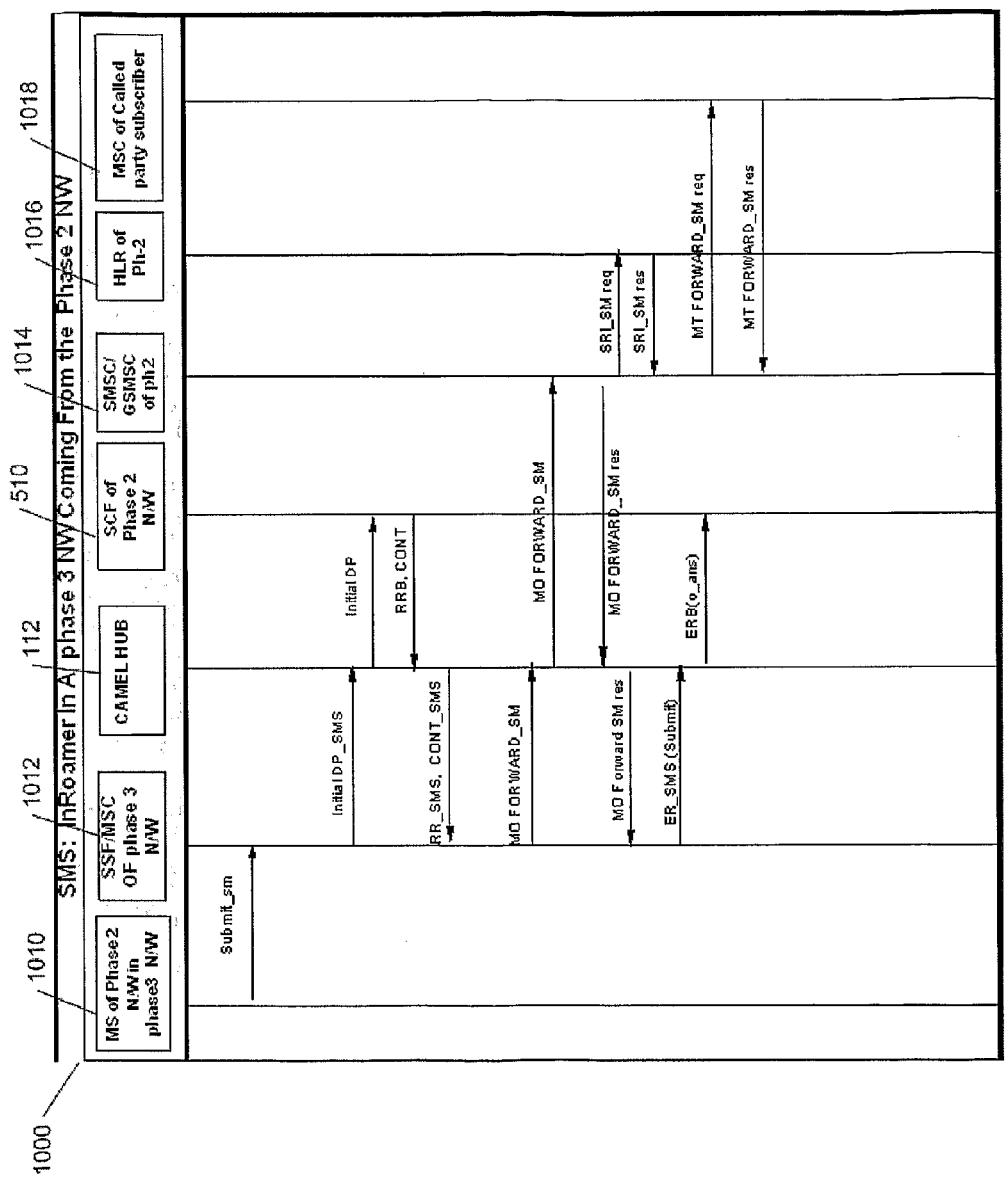
FIG. 10 illustrates the role of CAMEL HUB for MO/MT SMS for an In-roamer roaming in phase3 network coming from phase2 network.

FIG. 10 illustrates the flow for MO/MT SMS for an In-roamer roaming in phase3 network coming from phase2 network. In such a scenario, an In-roamer initiates a mobile originated SMS, roaming in phase3 network, coming from phase2 network the CAMEL HUB 112 takes care of the online charging of the MO SMS in a similar manner as explained supra. The functional blocks required in this scenario are mentioned in the FIG. 10 and include MS of Phase2 network in Phase3 network 1010, SSF/MSC of Phase3 network 1012, CAMEL HUB 112, and SCF of Phase2 network 1020, SMSC/GSMSC of Phase2 network 1014, HLR of Phase2 network 1016 and MSC 1018 of called party subscriber. The CAMEL HUB 112 is situated between the MSC of phase3 network 1012 and the SCF of phase2 network 1020 and handles all messages related to MO SMS. This flow also describes the MT SMS flow in which CAMEL HUB 112 does not come into picture. This is the case when subscriber moves from one network to another network, where both networks are of different CAMEL phase. One Initial_DP_SMS is received from the SSF of phase3 network; the CAMEL HUB 112 generates the Initial_DP message and sends to SCF of phase2 network.

The Called party number in init_DP is a special number provided by the HPLMN Operator. A special service can be defined for this special number in the SCF of HPLMN. With the help of this service, deduction of a SMS charge will be to done from the MO subscriber balance when ERB (o-ans) is received by SCF. This service also includes the feature that is incase SCF receives ERB (disconnect), then SCF credits the charge deducted from subscriber balance (this would be the case when MO-FSM fails). The CAMEL HUB 112 sends ERB (disconnect) when MO-FSM fails (SMS is not submitted to SMSC). In case CAMEL HUB 112 receives ER_SMS (submit), CAMEL HUB 112 will send ERB (o_ans) and if receives ER_SMS (failure) then it will send ERB (disconnect) After successful submission of msg to service center, CAMEL HUB 112 sends the ERB and ACR msg to SCF of phase2 network 510 having parameter of one pulse charging information.

In yet another scenario, an in-roamer initiates a mobile originated SMS, roaming in phase2 network, coming from phase1 network. The CAMEL HUB 112 takes care of the online charging of the MO SMS in a similar manner as explained supra. The functional blocks in such scenario includes: MS of Phase-1 network in Phase2 network, SSF of Phase2 network, CAMEL HUB 112, SCF of Phase 1 network, and SMSC/GSMSC of Phase-1 network, HLR of Phase-1 network and MSC of called party subscriber. The flow of information among these functional blocks is similar to as shown in the FIG. 10. The CAMEL HUB 112 is placed between MSC of phase2 network and SCF of phase1 network and will handle all messages related to MO SMS. Such flow of information also describes the MT SMS flow in which CAMEL HUB 112 do not come into picture. During this scenario when the subscriber moves from one network to another network, where both networks are of different phase. The init_DP message is sent by CAMEL HUB 112 after receiving the MO Forward SM msg. The Called party number in Init_DP is a special number provided by the HPLMN operator. A special service is defined for this special number in the SCF of HPLMN. With the help of this service, deduction of an SMS charge will be done from the MO subscriber balance when ERB (o-ans) is received by SCF. Such a service also have the feature that if SCF receives ERB (disconnect), and then SCF therefore credits the charge deducted from the subscriber balance (this would be the case when MO-FSM fails). The CAMEL HUB 112 sends an ERB (disconnect) when MO-FSM fails (SMS is not submitted to SMSC). After successful submission of message to its service center, CAMEL HUB 112 sends ERB (o-ans) to SCF.

Further, in an another scenario, an In-roamer initiates a mobile originated SMS, roaming in phase3 network, coming from phase1 network. The CAMEL HUB 112 takes care of online charging of the MO SMS in a similar manner as explained supra with reference to FIG. 2. The functional blocks involved in such situation are MS of Phase-1 network in Phase-3 network, SSF/MSC of Phase-3 network, CAMEL HUB 112, SCF of Phase-1 network, SMSC/GSMSC of Phase1, HLR of Phase1, MSC of called party subscriber. The flow of instructions among these functional blocks would remain similar to as explained in 10. The CAMEL HUB 112 plays an important role and is placed between MSC of phase3 network and SCF of phase1 network handling all the messages related to MO SMS. In such case when a subscriber moves from one network to another network, where both the networks are of different phase INIT_DP sent by CAMEL HUB after receiving the IDP_SMS. The called party number in Init_DP is a special number provided by the HPLMN operator. A special service is defined for this special number in the SCF of HPLMN. With the help of this service, deduction of a SMS charge is done from the MO subscriber balance when ERB (o-ans) received by SCF. This service should also have the feature that if SCF receives ERB (disconnect), and then SCF credits the charge deducted from subscriber balance (this would be the case when MO-FSM fails). The CAMEL HUB 112 sends ERB (disconnect) when MO-FSM fails (SMS is not submitted to SMSC). After successful submission of msg to service center, SSF sends ER_SMS (submit) and CAMEL HUB sends the ERB (o-ans) msg to phase1 SCF.

MO/MT Call

The initiation of MO/MT call in a cross phase roaming includes various scenarios such as MO/MT call from phase2 to phase3, MO/MT call from phase1 to phase2 and MO/MT call from phase1 to phase3. These location updates for MO/MT call in various locations are further explained in detail below.

Figure 11:
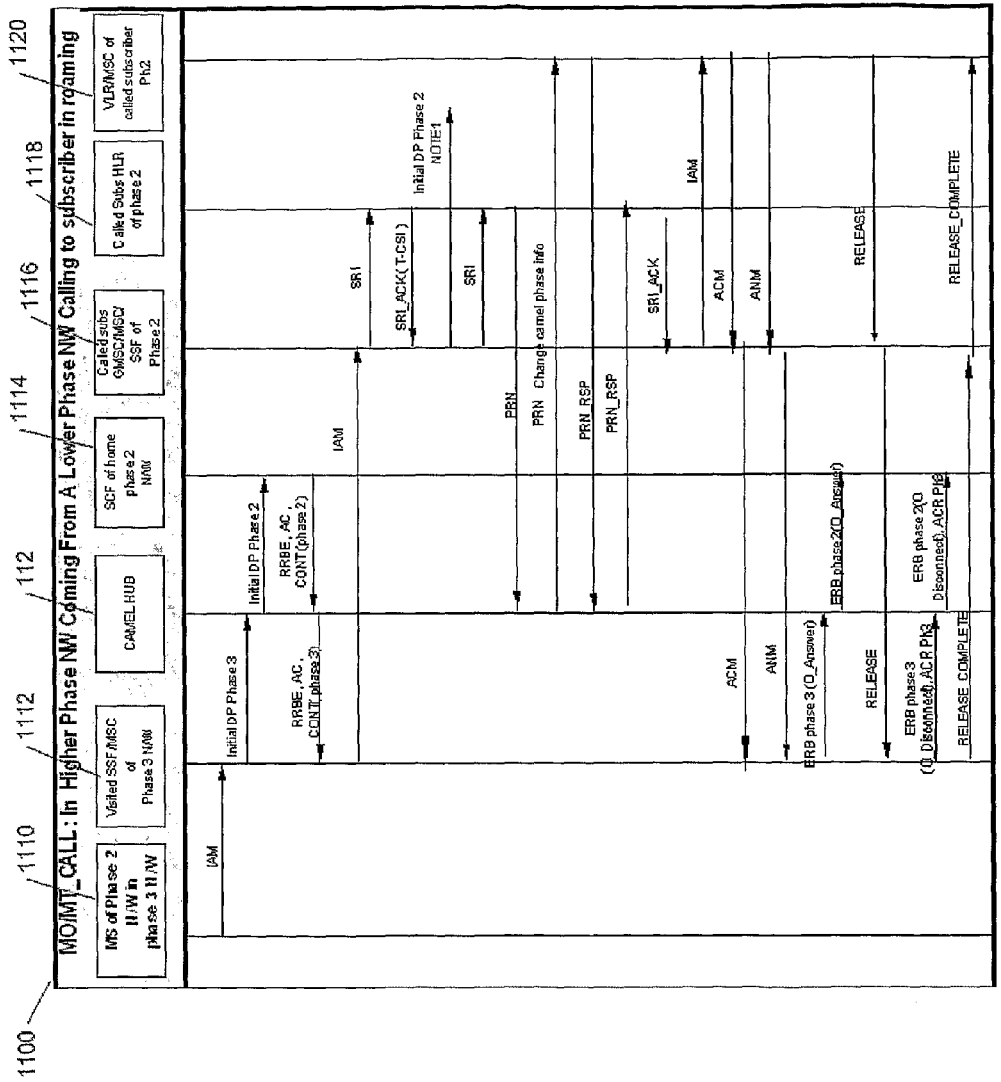
FIG. 11 illustrates the location update for MO/MT Call for an In-roamer roaming in phase2 coming from phase3.

FIG. 11 illustrates the flow for MO/MT Call for an in-roamer roaming in phase2 network coming from phase3 network. The in-Roamer initiates a mobile originated call; the CAMEL HUB 112 takes care of phase difference between home and visited network. As shown in FIG. 11, the functional blocks are MS of Phase-2 network in Phase-3 network 1110, visited SSF/MSC of Phase-3 network 1112, CAMEL HUB 112, SCF of Home Phase-2 network 1114, Called Subs GSMSC/MSC/SSF of Phase-2 1116, called subs HLR of Phase-2 1118 and VLR/MSC of called subs Phase-2 1120. The flow of information among these functional blocks are clearly shown in FIG. 11. The CAMEL HUB 112 is placed between the visited SSF/MSC of phase3 network 1112 and SCF of home phase2 network 1114 and handles messages related to MO call.

In this scenario, a subscriber of phase2 network comes in phase3 network and tries to call its home network subscriber (called subscriber is in its own home network). The CAMEL HUB 112 converts the phase3. Initial DP message received from SSF of phase3 network, into phase2 Initial DP message In a similar manner as explained supra with reference to FIG. 2. The phase2 Initial DP message is further sent to the SCF of phase2 network. On receiving Request Report BCSM Event (RRBE)/Apply Charging (AC)/Continue (CONT) message, the SSF of phase3 network establishes the MO call. It should be noted that the MT call flow is not covered in this FIG. 11. The CAMEL HUB 112 will come into picture in MT call only if its partner network subs is roaming in another partner network.

In yet another scenario, an in-roamer initiates a Mobile Originated call, roaming in phase2 network, coming from phase1 network. The CAMEL HUB 112 takes care of phase difference between home and visited network in a similar manner as explained supra with reference to FIG. 2. The functional blocks for such a scenario are MS of Phase-1 Network in Phase-2 Network, Visited SSF/MSC of phase-2 network, CAMEL HUB, SCF of Home Phase-1 network, Called Subs GSMSC/MSC/SSF of phase1, Called subs HLR of Phase-1 and VLR/MSC of called subscriber Phase-1. The flows of instructions among these functional blocks are similar to as mentioned in the FIG. 11. The CAMEL HUB 112 is situated between the visited SSF/MSC of phase2 network and SCF of home phase1 network. In this scenario when the subscriber of phase1 network comes in phase2 network and tries to call its home network subscriber (called subscriber is in its own home network). The CAMEL HUB 112 converts the phase2 Initial DP message, received from SSF of phase3 network, into phase1 Initial DP message. The phase1 Initial DP message is further sent to the SCF of phase2 network. On receiving Request Report Basic Call State Model (BCSM) Event (RRBE)/Apply Charging (AC)/Continue (CONT) message, the SSF of phase2 network establishes the MO call. As phase1 do not have Apply Charging, so CAMEL HUB needs an operator specific Billing Interface to have information about call characteristics and communicate with the other phase by Apply Charging. This will be a specific operator dependent interface to handle billing requirements. It should be noted that CAMEL HUB 112 will come into picture in MT call only if its partner network subs is roaming in another partner network.

In yet another scenario, an In-Roamer initiates a Mobile Originated call, roaming in phase3 network, coming from phase1 network. In such a scenario the CAMEL HUB 112 takes care of phase difference between home and visited network. The functional blocks in such scenario are MS of Phase-1 network in Phase-3 network, Visited SSF/MSC of phase-3 network, CAMEL HUB 112, SCF of Home Phase-1 network, Called Subs GSMSC/MSC/SSF of Phase1, Called subs HLR of Phase-1 and VLR/MSC of called subscriber Phase-1. The flow of information among these functional blocks are similar to as shown in FIG. 11. The CAMEL HUB 112 is placed between the visited SSF/MSC of phase3 network and SCF of phase1 network and handles messages related to MO call in a similar manner as explained supra with reference to FIG. 2. This flow of information in this scenario includes the MT call flow and termination of call. In this case when the subscriber of phase1 network comes in phase3 network and tries to call its home network subscriber (called subscriber is in its own home network). The CAMEL HUB 112 converts the phase3 Initial DP message, received from SSF of phase3 network, into phase1 Initial DP message. The phase1 Initial DP message is further sent to the SCF of phase1 network. On receiving Request Report BCSM Event (RRBE)/Apply Charging (AC)/Continue (CONT) message, the SSF of phase3 network establishes the MO call. As phase1 network does not support apply charging, so CAMEL HUB 112 needs an operator specific billing Interface to have information about call characteristics and communicate with the other phase by Apply Charging. This will be a specific operator dependent interface to handle billing requirements. It is to be noted that the CAMEL HUB 112 will function in MT call only if its partner network subs is roaming in another partner network.

GPRS Session Flow

The initiation of GPRS session flow in a cross phase roaming includes various scenarios such as GPRS session flow from phase2 to phase3, GPRS session flow from phase1 to phase2 and GPRS session flow from phase1 to phase3. These GPRS session flow in various scenarios are further explained in detail below.

Figure 12:
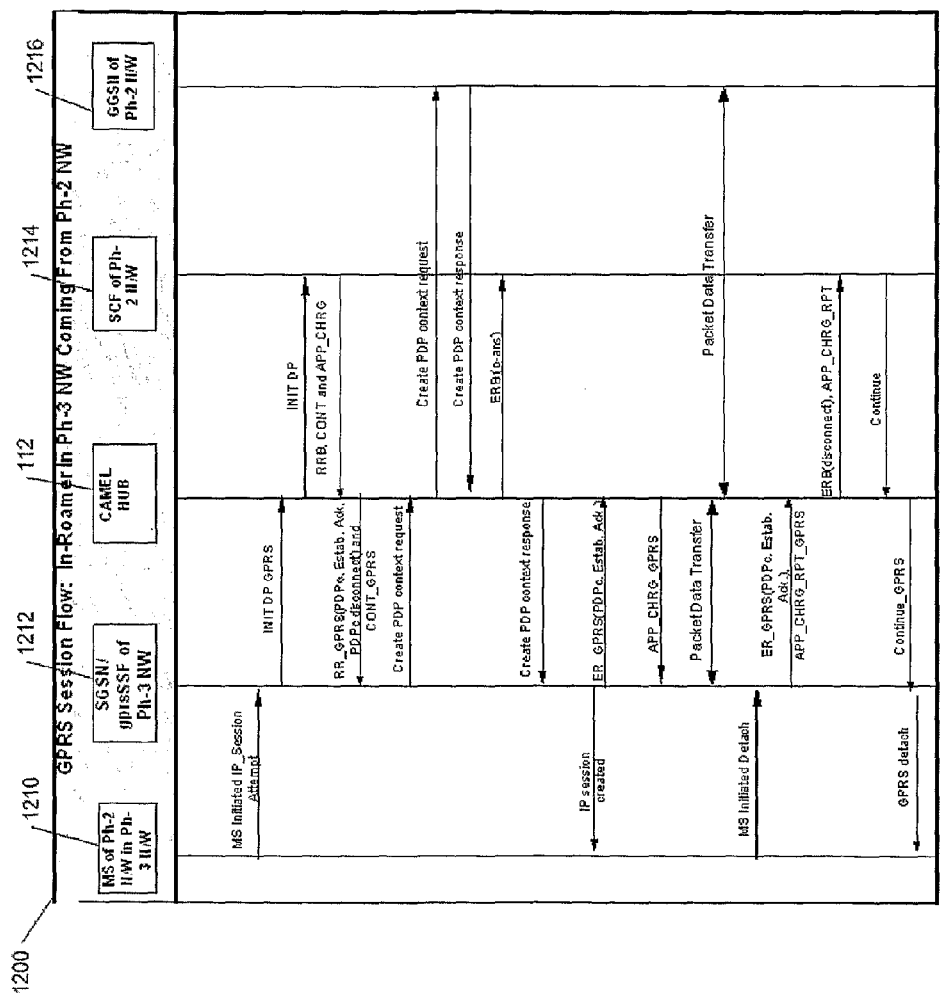
FIG. 12 illustrates the location update of GPRS session flow an In-roamer coming to CAMEL phase3 network from CAMEL phase2 network.

FIG. 12 illustrates the GPRS session flow of an In-roamer coming to CAMEL phase3 network from CAMEL phase2 network. The CAMEL HUB 112 acts as virtual SGSN and changes the SGSN capability of LU GPRS message, along with other activities to achieve the phase-independent roaming in a similar manner as explained supra with reference to FIG. 2. The functional block involved in this scenario are MS of Phase2 in Phase3 network 1210, SGSN/GPRSSSF of Phase3 network 1212, CAMEL HUB 112, SCF of PHASE2 network 1214 and GGSN of Phase2 network 1216. The functioning of these functional blocks are defined in the FIG. 12.

In this scenario the subscriber moves from Phase2 to Phase3 network and uses GPRS services. The SGSN makes a query to know the IP address of GGSN with its own DNS. The DNS query response consists of an IP address for CAMEL HUB 112. On receiving IDP_GPRS from phase3 network, the CAMEL HUB 112 sends IDP to the SCF of the phase2 network. The IDP, initiated by CAMEL HUB 112, has a special number filled in called party address (provided by HPLMN operator) parameter. The operator should have a special service for this number, with the help of which SCF should check the balance of calling subscriber and sends APP_CHRG (Apply Charging) to CAMEL HUB. SGSN sends Create PDP context request to CAMEL HUB and it sends this request further to actual GGSN as find the GGSN address from the DNS query. After Receiving Create PDP context response, the CAMEL HUB 112 sends ER_GPRS with event PDP context established ack. The GPRS session is created and packet data is transferred through this IP channel. The PDP context disconnect event is generated, when MS initiates GPRS Detach.

In another scenario when a subscriber roams in CAMEL phase2 network coming from CAMEL phase1 network, CAMEL HUB handles the CAP messages for its GPRS charging in a similar manner as explained supra with reference to FIG. 2. The GPRS PDP Activation and Session procedures will be transparent for the HUB node. The functional block in this scenario involves MS of phase1 in Phase2 Network, SGSN of Phase-2 network, CAMEL HUB, SCF of phase-1 network, GGSN of Phase-1 network. The flow of information among these functional block will be similar to as explained in FIG. 12. In this case the subscriber moves from Phase1 to Phase2 network and uses GPRS services. The SGSN makes a query to know the IP address of GGSN with its own DNS. The DNS query response includes the IP address of CAMEL HUB 112. SGSN send Create PDP context to CAMEL HUB 112. CAMEL HUB 112 sends IDP to the SCF of the subscriber. A special number is filled by the CAMEL HUB 112 in the IDP's called party number parameter. (This is provided by HPLMN operator). CAMEL HUB makes a query to know the Actual GGSN IP address according to APN and sends Create PDP context request to GGSN on the IP address found in DNS query response. After Receiving Create PDP context response, the CAMEL HUB 112 sends ERB (O-Ans). An IN interface would be needed to know the billing characteristic of the subscriber with his home network IN system. GPRS session is created and Packet Data is transferring through this IP channel. Finally, PDP context disconnect event is generated during the Detach process.

In other scenario when a subscriber roams in CAMEL phase3 network coming from CAMEL phase1 network the CAMEL HUB 112 will handle the CAP messages for its GPRS charging in a similar manner as explained supra with reference to FIG. 2. The GPRS PDP Activation and Session procedures will be transparent for the HUB node. The functional blocks involved in this scenario are MS of Phase1 in Phase3 network, SGSN/grpsSSF of Phase-3 network, CAMEL HUB 112, SCF of phase-1 network and GGSN of Phase-1 network. The flow of information within these functional blocks is similar to as explained in the FIG. 12. In this case the subscriber moves from Phase1 to Phase3 network and uses GPRS services. SGSN makes a query to know the IP address of GGSN with its own DNS. DNS query response will consist IP address of CAMEL HUB the CAMEL HUB sends IDP to the SCF of the subscriber. IDP initiated by CAMEL HUB 112 will have a special number in called party number, which would be provided by HPLMN operator. SGSN sends the Create PDP context to CAMEL HUB 112 and CAMEL HUB 112 generates create PDP context request further to actual GGSN, found IP of actual GGSN from DNS query made by CAMEL HUB 112. After Receiving Create PDP context response, the CAMEL HUB 112 sends ER_GPRS with event PDP context established ack. An IN interface is needed to know the billing characteristic of the subscriber, with his home network's IN system. The GPRS session is created and Packet Data is transferring through this IP channel. Further, the PDP context disconnect event is generated.

As operators across the world expect a particular set of parameters in the message, this typically varies from operator to operator. So it is not possible for the every operator to be compatible with every other operator in terms of message parameters. The CAMEL HUB 112 will add/modify the parameters in the message in scenarios where the message if sent in its original form will be incompatible at other operator. HUB operator will have the interface and means to define the rules to be applicable for the operator pairs. The CAMEL HUB therefore includes various other features such as Parameter Substitution, Message Substitution & Premium Number Tagging which helps to remove incompatibilities across different Visited & Home CAMEL phase or the same CAMEL Phase and can therefore be explained herein detail below.

Parameter Substitution

CAMEL HUB 112 maintains database tables used for parameter substitution and when any IDP (Initial DP) or Connect (CON) comes to CAMEL HUB 112 node, it matches the designated criteria (as per configuration) and performs the parameter modification for different CAMEL Message parameters. Some of the cases are described below.

(a) Destination Routing Number in CONNECT Message

If action point found as parameter substitution after successfully matching the criteria and CAMEL HUB 112 receives CONNECT message, CAMEL HUB 112 checks if any prefix or suffix has been configured for this rule against the pair of home network and visited network. If any prefix or suffix is found configured, CAMEL HUB 112 node applies the prefix/suffix as applicable to the number. CAMEL HUB 112 also checks for Nature of Address Indicator (NAI) field. In case it is configured in the system according to visited network's Country Code-National Destination Code (CC-NDC) (since destination network of Connect is visited network), then CAMEL HUB 112 also applies these new NAI and NPI field in destination routing number.

(b) Location Information in IDP Message

In case action point found as parameter substitution after successfully matching the criteria and CAMEL HUB 112 would receive IDP message, CAMEL HUB will check its memory where it has stored value in the table according to home CC-NDC (since destination of IDP message would be home network) and parameter id (assigned to CellGlobalIdOrServiceAreaIdorLAI and VLR number). If CAMEL HUB will find any entry in its memory according to above criteria then it will replace the parameter value with configured one according to parameter id.

c) Called Party BCD Number in IDP Message

If action point found as parameter substitution after successfully matching the criteria and CAMEL HUB 112 would receive IDP message, CAMEL HUB 112 therefore checks its memory where it has stored the value in the table according to home CC-NDC (since destination of IDP message would be home network) and parameter id (assigned to calledPartyBCDNumber). In case CAMEL HUB 112 finds any entry (Type of Number (TON) and NPI field for calledPartyBCDNumber) in its memory according to above criteria afterwards it replaces the parameter value with configured one according to parameter id.

(d) Time and Time-Zone in IDP Message

In case action point found as parameter substitution after successfully matching the criteria and CAMEL HUB 112 would receive IDP message, CAMEL HUB 112 therefore will check its memory where it has stored value in the table according to home CC-NDC (since destination of IDP message would be home network) parameter id (assigned to timeAndTimezone). In a case where CAMEL HUB 112 finds any entry in its memory according to above criteria then in such a situation the CAMEL HUB 112 would replace the parameter value with configured one according to parameter id.

Message Change to Remove Incompatibilities:

Above mentioned are CAMEL HUB capabilities for cross phase roaming from higher CAMEL phase to lower CAMEL phase and cross phase roaming from lower CAMEL phase to higher CAMEL phase. The other capabilities of CAMEL HUB are message change to remove incompatibility and parameter addition/change to remove incompatibility. The message substitution can be done in such a case to remove incompatibilities and therefore is explained herein below.

The CAMEL HUB modifies the message in scenarios where the message if sent in its original form is incompatible at other operator. The HUB operator will have the interface and means to define the rules to be applicable for the operator pairs. There are two types of message changes as described below:

1. CONTINUE Message Changed to CONNECT

This is desirable when the operator wants to connect the user call to some number other than the user dialed number. As the user dialed number may not be known in the visited network and if not changed via CONNECT operation, will lead to Route Select Failure, thereby resulting in call drop.

The message substitution is done in only short code conversion and calledPartyBCDNumber parameter substitution of IDP. In this case, CAMEL HUB 112 will keep the changed value of calledPartyBCDNumber in memory on per dialogue basis and accordingly sends it in CONNECT Message (destination routing number). In case of tagging, continue will be send as it is.

2 CONNECT Message Changed to CONTINUE

This is needed for the operators where the operator equipment (MSC) can't handle the CONNECT operation and if sent causes the MSC to behave in incoherent way. CAMEL HUB modifies the message in this scenario to CONTINUE if there is no loss of information in doing so.

The substitution for CONNECT to CONTINUE message can be done in the cases such as:

a. When tagging has been applied to IDP and Connect comes from SCP. Destination routing number in CONNECT message is same as calledPartyBCDNumber came in IDP.

b. When tagging has been applied to IDP and Connect comes from SCP. Destination routing number in CONNECT is same as tagged calledPartyBCDNumber sent in IDP.

c. If no action is taken on IDP, but message substitution is defined as action point on criteria matching and criteria has matched. IDP send to SCP would be same as received; now Connect will be sent by SCP. In case destination routing number in Connect is same as calledPartyBCDNumber of IDP, CAMEL HUB 112 instead of Connect will send Continue.

Special/Premium Number Tagging

The special/premium number tagging is explained in following manner mentioned below:

1. CAMEL HUB 112 maintains database table. And when any IDP comes to CAMEL HUB 112 node, it matches the criteria and in case the criteria is matched and action point on that criterion is found as tagging, then CAMEL HUB 112 checks its memory area where all special numbers and tags are kept with their home Mobile Country Code-Mobile Network Code (MCC-MNC). If calledPartyBCDNumber in IDP matches with any special number stored in memory of CAMEL HUB 112 according to home network's MCC-MNC (which can be fetched from International Mobile Subscriber Identity (IMSI) field came in IDP), then CAMEL HUB 112 will replace this calledPartyBCDNumber with tagged number in IDP.

2. CAMEL HUB 112 stores a flag for tagging on per dialogue basis. In case CAMEL HUB 112 tags calledPartyBCDNumber then CAMEL HUB 112 make this flag TRUE (initial value of this flag will be FALSE) and stores the tagged calledPartyBCDNumber also in its memory on per dialogue basis.

3. When Continue comes to CAMEL HUB 112 node, it checks the above flag. In case this flag is found TRUE then Continue is sent to SSP as it is.

4. When Connect comes to CAMEL HUB 112 node and this flag found TRUE for that dialogue, then CAMEL HUB 112 matches destination routing number came in Connect with the tagged calledPartyBCDNumber and calledPartyBCDNumber came in IDP from SSP. If destination routing number matched with any of these calledPartyBCDNumber and no other parameter is filled in Connect other than destination routing number, Connect→Continue substitution is made by CAMEL HUB 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for providing customized application for mobile network enhanced logic (CAMEL) roaming, the system comprising:

a CAMEL HUB comprising:

a signaling system module configured to implement signaling system 7 (SS7) and to receive a message via a SS7 interface;

a CAMEL HUB Application module configured to execute in CAMEL application part (CAP) stack layer of the SS7 communication interface to:

process the message received by the signaling system module to determine a CAMEL phase relationship between a home network operator and a visited network operator; and modify the message when the determined CAMEL phase relationship indicates that the home network operator has CAMEL phase different from that of the visited network operator; and an operation and management (O&M) module configured to monitor functioning of the signaling system module and the CAMEL HUB application module.

2. The system as claimed in claim 1, wherein the message corresponds to one of mobile application part (MAP) message or CAMEL message.

3. The system as claimed in claim 2, wherein the MAP message corresponds to one of location update, location update for general packet radio service (GPRS), mobile originated/mobile terminated short message service (MO/MT SMS), /mobile terminated (MT) voice calls and general packet radio service (GPRS) Session Flow.

4. The system as claimed in claim 2, wherein the CAMEL message corresponds to messages for mobile originated call including one of: initial_detection point (DP), request report basic call state model event (RRBE), apply charging, event report basic call state model (ERB), initial detection point short message service (DP_SMS) and the like.

5. The system as claimed in claim 1, wherein the CAMEL HUB application is configured to relay the message back to the signaling system module when it is determined that there is no relationship between the home network operators and visited network operator.

6. The system as claimed in claim 5, wherein the CAMEL HUB application is configured to generate an event data record (EDR), trace, and a call data record (CDR) corresponding to the message.

7. The system as claimed in claim 1, wherein the CAMEL HUB application is configured to search for information associated with the relationship between the home network operator and visited network operator in a database.

8. The system as claimed in claim 1, wherein the CAMEL HUB application module is further configured to perform at least one of: substitution of the message, substitution of a parameter associated with the message, and premium number tagging.

* * * * *